(12) United States Patent
Smith et al.

(10) Patent No.: US 12,487,682 B2
(45) Date of Patent: Dec. 2, 2025

(54) USER INTERFACES FOR BRACKETS

(71) Applicant: Apple Inc., Cupertino, CA (US)

(72) Inventors: Emmet R. Smith, San Jose, CA (US);
Mark D. Majdanski, Santa Clara, CA (US); James H. Brasure, Belmont, CA (US); Fernando Garcia, Redondo Beach, CA (US); William D. Carpenter, Pacifica, CA (US); Anton M. Davydov, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 18/511,891

(22) Filed: Nov. 16, 2023

(65) Prior Publication Data

US 2024/0160293 A1   May 16, 2024

Related U.S. Application Data

(60) Provisional application No. 63/489,726, filed on Mar. 10, 2023, provisional application No. 63/384,091, filed on Nov. 16, 2022.

(51) Int. Cl.
*G06F 3/01* (2006.01)
(52) U.S. Cl.
CPC .................................. *G06F 3/017* (2013.01)
(58) Field of Classification Search
None
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,933,937 B2 | 4/2018 | Lemay et al. |
| 2002/0015024 A1 | 2/2002 | Westerman et al. |
| 2005/0190059 A1 | 9/2005 | Wehrenberg |
| 2006/0017692 A1* | 1/2006 | Wehrenberg .......... G06F 1/1694 700/302 |
| 2006/0033724 A1 | 2/2006 | Chaudhri et al. |

(Continued)

FOREIGN PATENT DOCUMENTS

| | | |
|---|---|---|
| WO | 2013/169849 A2 | 11/2013 |
| WO | 2014/105276 A1 | 7/2014 |

*Primary Examiner* — Tuan S Nguyen
(74) *Attorney, Agent, or Firm* — Kubota & Basol LLP

(57) ABSTRACT

In some embodiments, an electronic device presents representations of events arranged in a bracket. In some embodiments, in response to receiving an input corresponding to a request to update a view level of the bracket, the electronic device updates the presentation of information included in representations of events included in the bracket.

37 Claims, 17 Drawing Sheets

(56) References Cited

U.S. PATENT DOCUMENTS

| | | | |
|---|---|---|---|
| 2006/0197753 A1 | 9/2006 | Hotelling | |
| 2013/0246934 A1* | 9/2013 | Wade | G06Q 30/06 |
| | | | 715/745 |
| 2016/0048263 A1* | 2/2016 | Hiraga | G06F 3/04817 |
| | | | 345/173 |

* cited by examiner

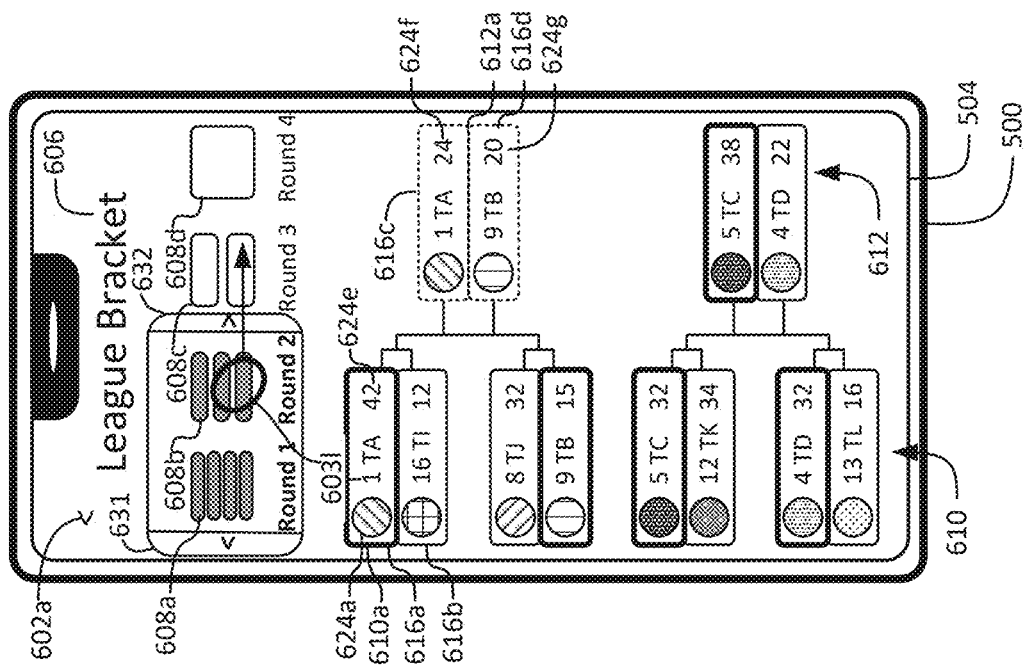

USER INTERFACES FOR BRACKETS

CROSS-REFERENCE TO RELATED APPLICATIONS

This application claims the benefit of U.S. Provisional Application No. 63/384,091, filed Nov. 16, 2022, and U.S. Provisional Application No. 63/489,726, filed Mar. 10, 2023, the contents of which are herein incorporated by reference in their entireties for all purposes.

FIELD OF THE DISCLOSURE

This disclosure relates generally to an electronic device displaying an interactive bracket including representations of events included in the bracket.

BACKGROUND OF THE DISCLOSURE

User interaction with electronic devices has increased significantly in recent years. These devices can be devices such as computers, tablet computers, televisions, multimedia devices, or mobile devices. While interacting with content in an application of an electronic device, the user may wish to view representations of a series of events arranged in a multi-level hierarchy, e.g., a bracket. The user may therefore desire efficient ways in which the electronic device presents events in a multi-level hierarchy.

SUMMARY OF THE DISCLOSURE

In some embodiments, an electronic device presents representations of events arranged in a multi-level hierarchy, e.g., a bracket. For example, a bracket may represent a series of events, like sports games, played in multiple rounds. In some embodiments, in response to receiving an input to update a level of the hierarchy, the electronic device updates the presentation of level information, e.g., changes the presentation of events from one level of the hierarchy to another level. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 6A-6M illustrate examples of an electronic device presenting representations of events arranged in a bracket in accordance with some embodiments of the disclosure.

DETAILED DESCRIPTION

Figure 1A:
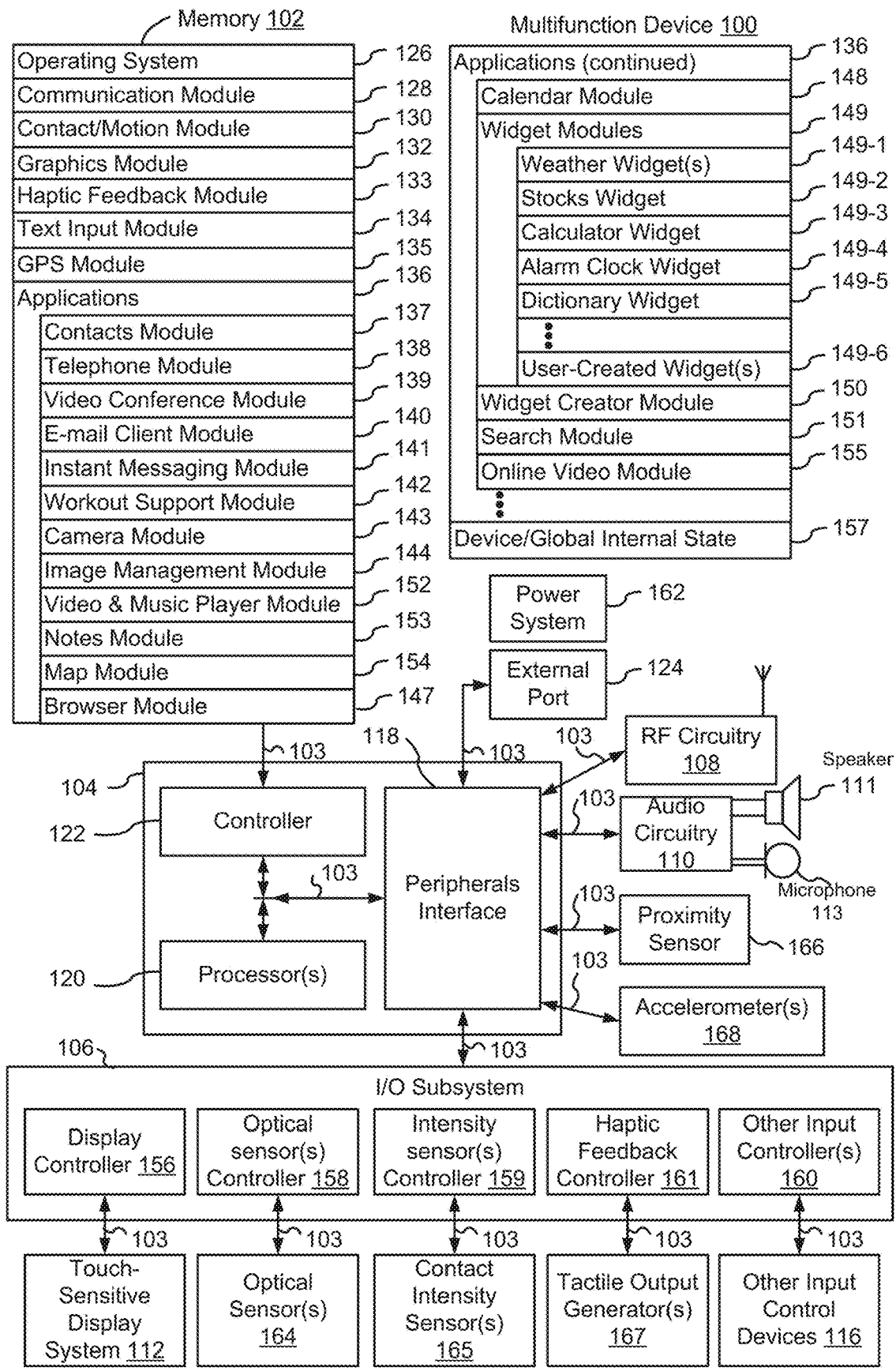
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for user interfaces of an application that can present representations of events arranged in a bracket. In some implementations, while displaying the bracket, the electronic device receives an input corresponding to a request to change a view level with which the bracket is displayed. In response to the input, the electronic device updates the bracket to include the representations of events displayed with a presentation that differs from the previous presentation in a manner other than size in some embodiments. Further, such techniques enable the user to efficiently toggle between depth and breadth of information about the events, thus reducing the number of inputs needed to sort through and identify content that the user may have an interest in, thereby reducing power usage and improving the battery life of the electronic device Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
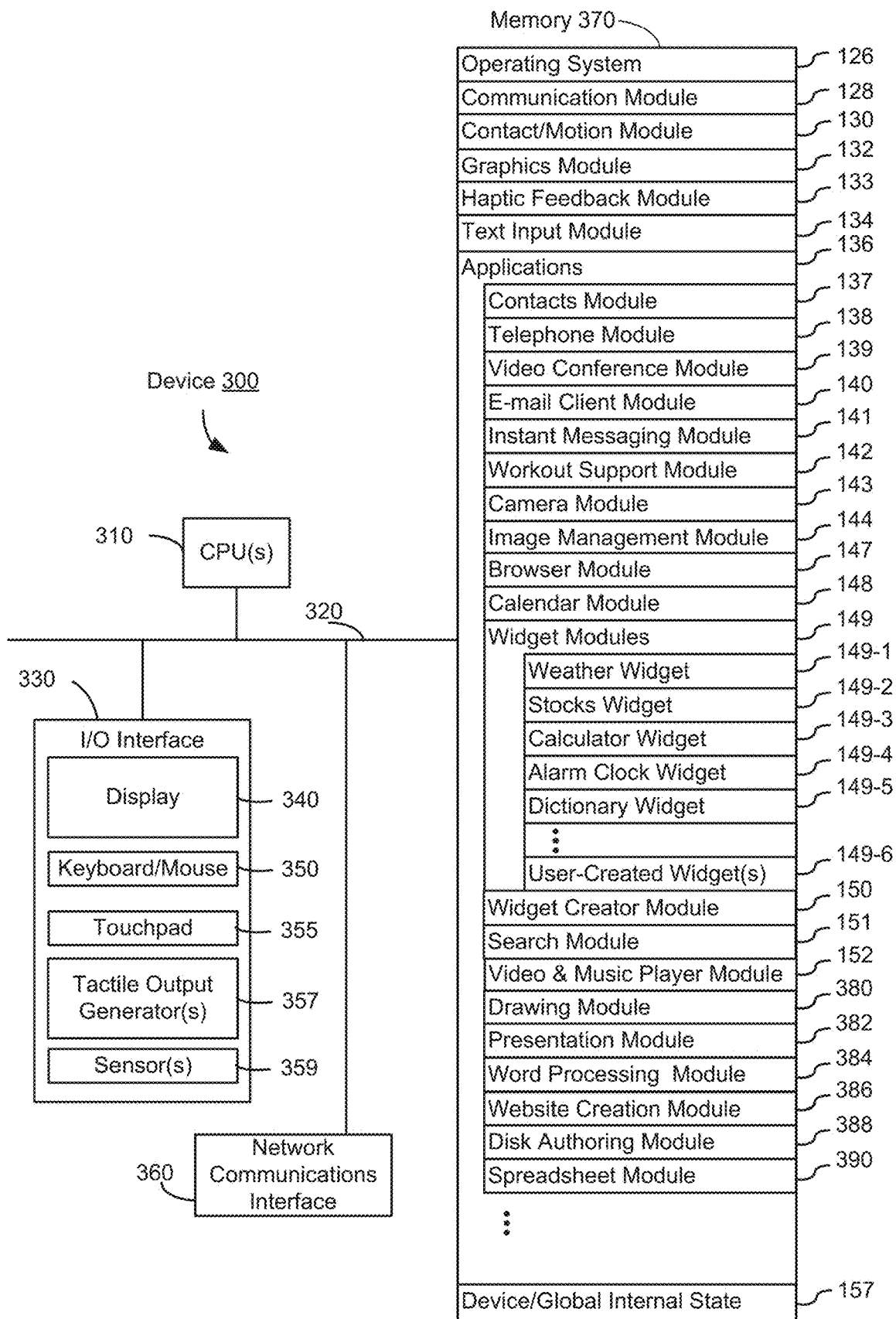
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
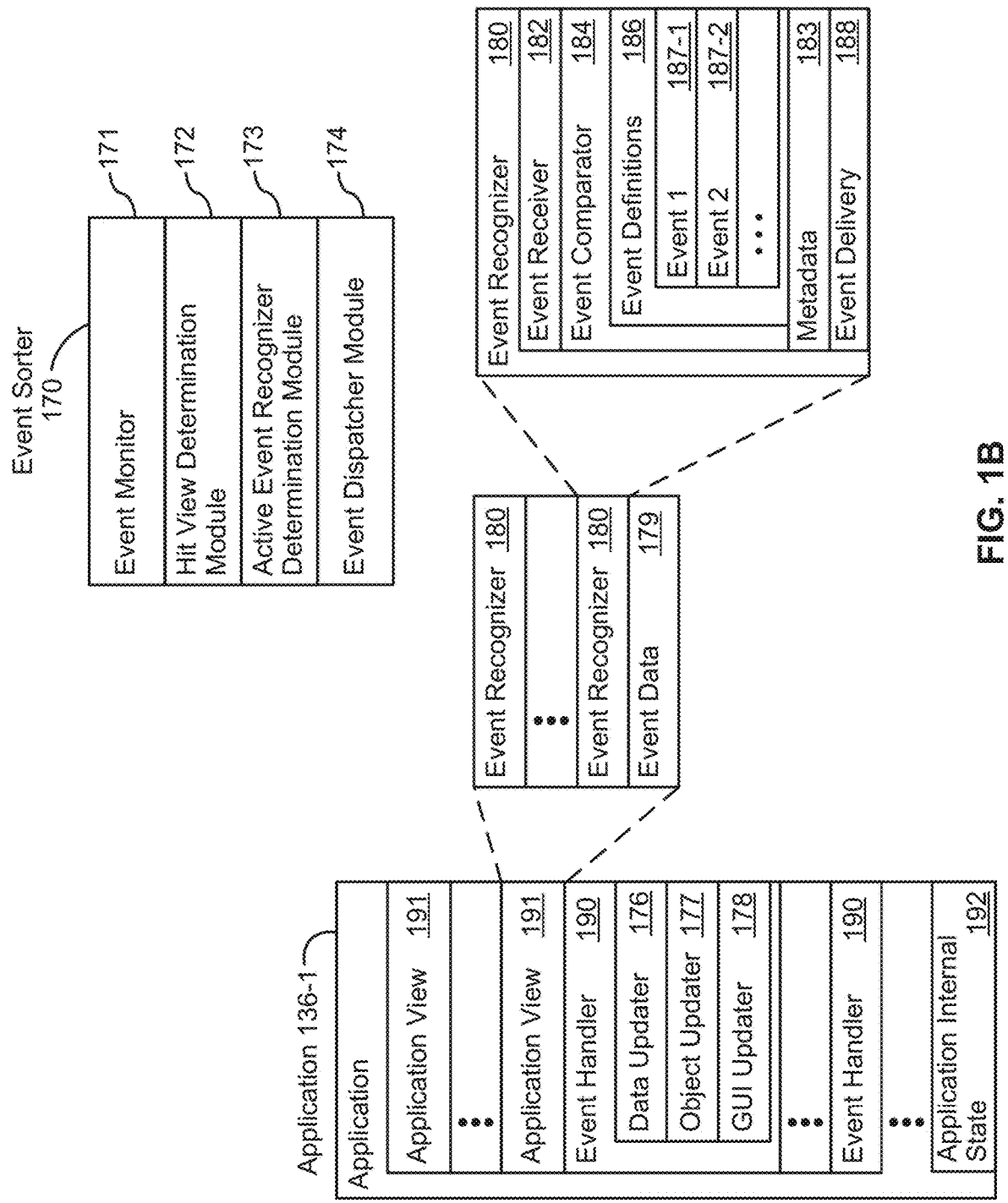
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
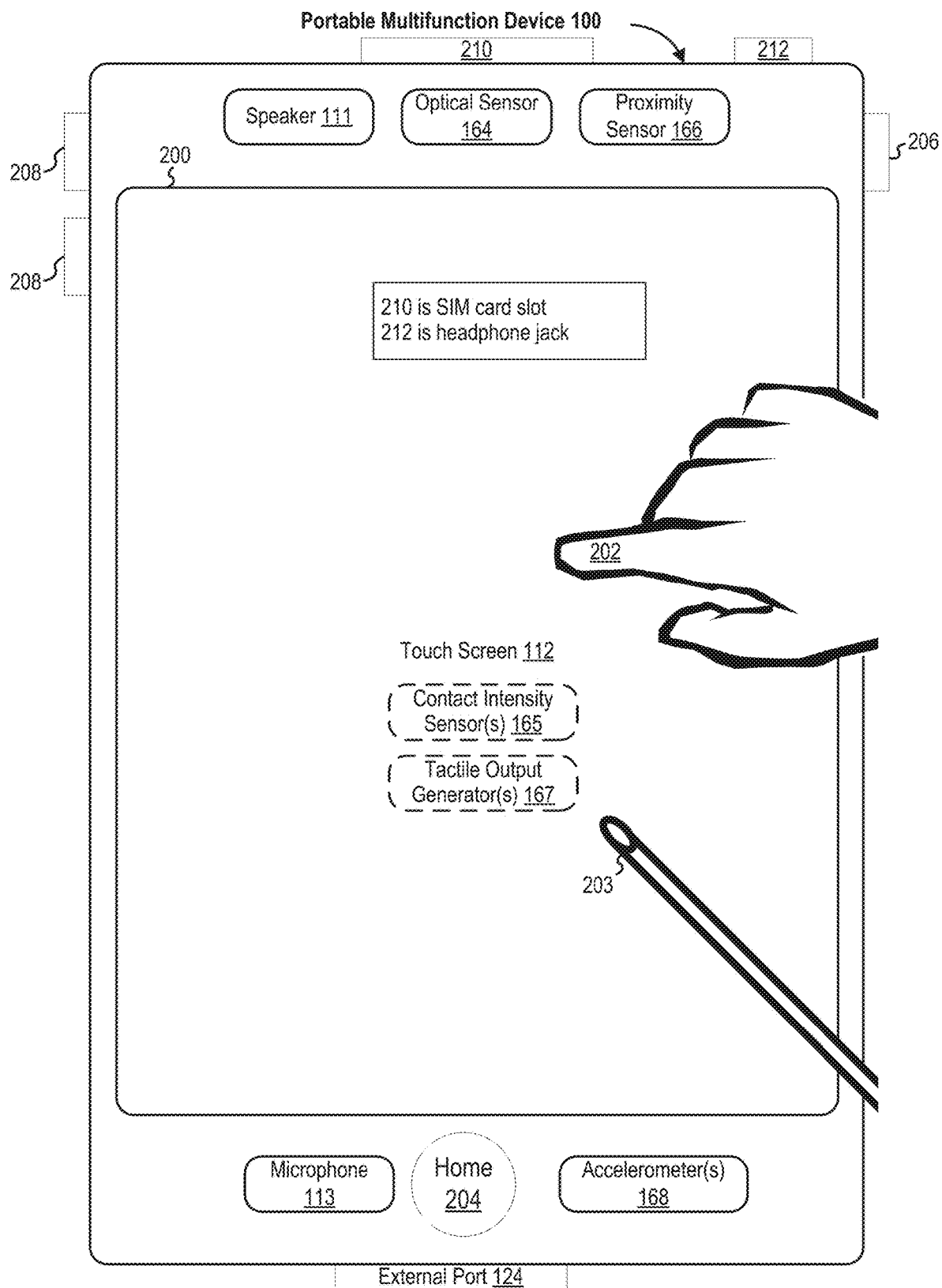
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
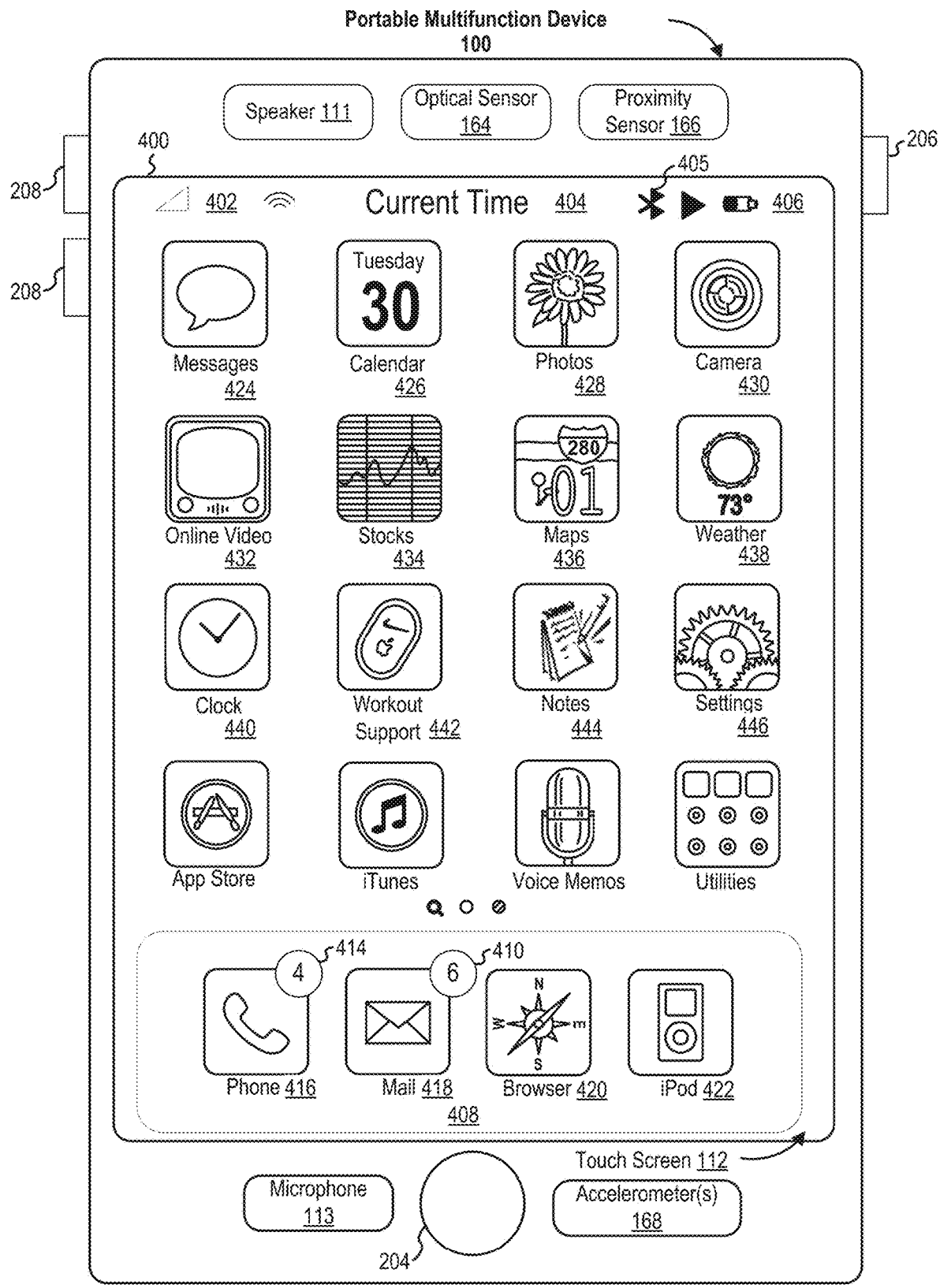
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
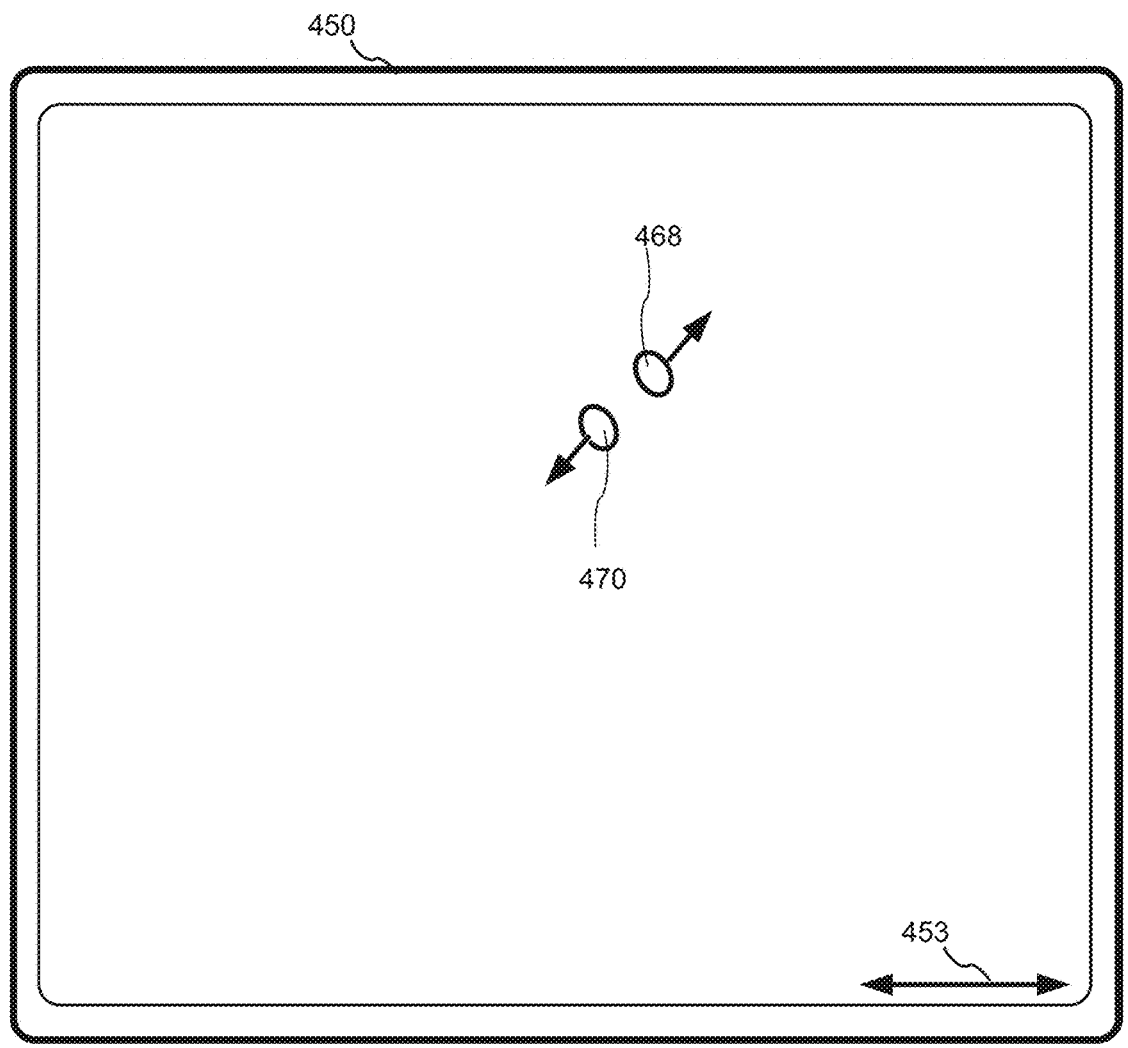
FIG. 4B illustrates an exemplary user interface for a multifunction device with a touch-sensitive surface that is separate from the display in accordance with some embodiments.
Figure 4B:
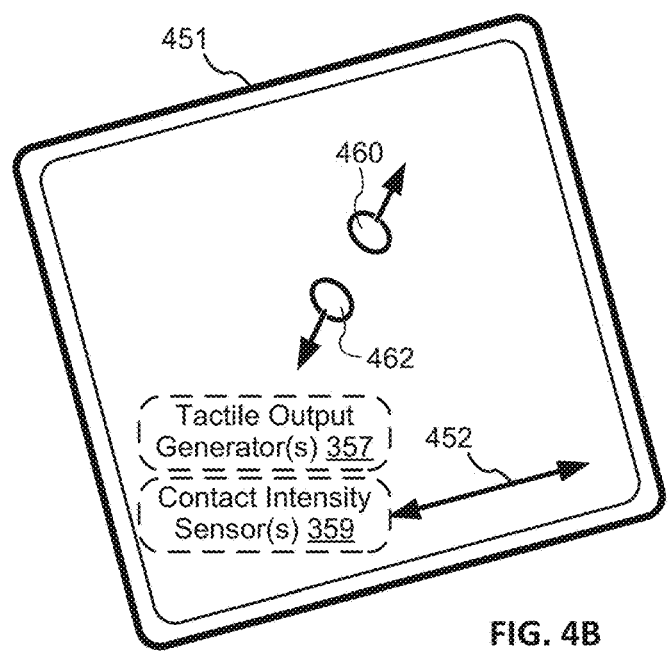

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
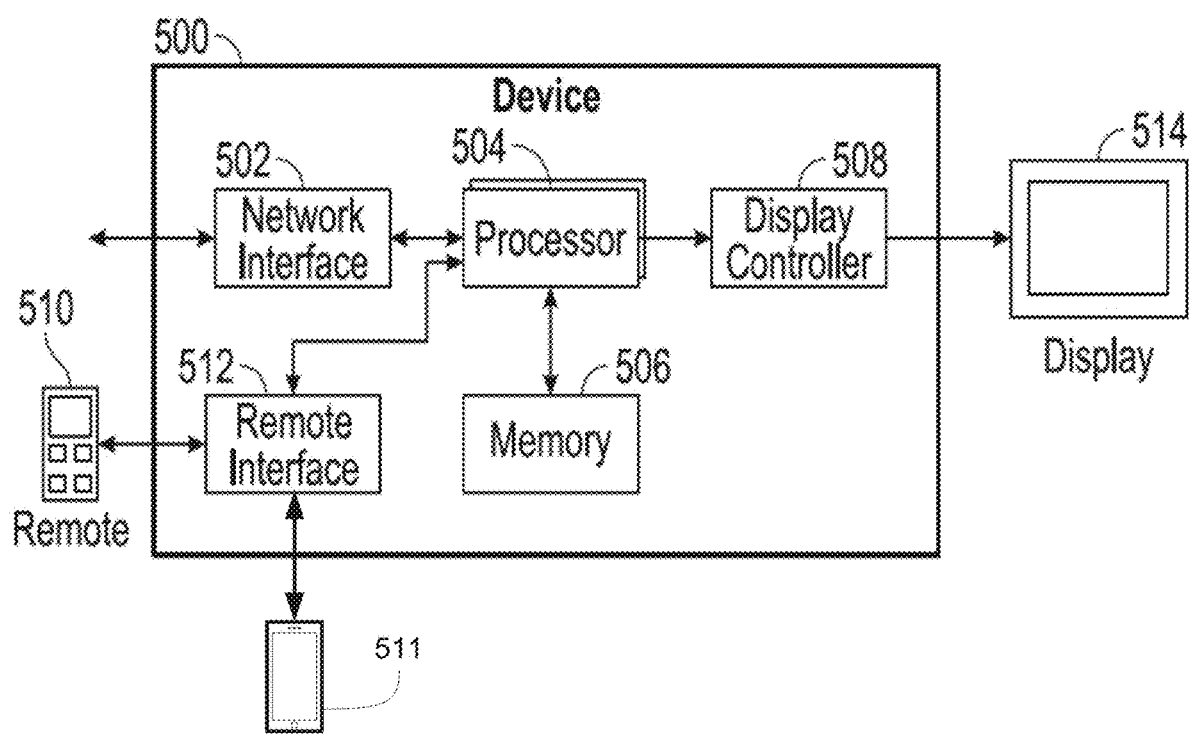
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIGS. 5, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
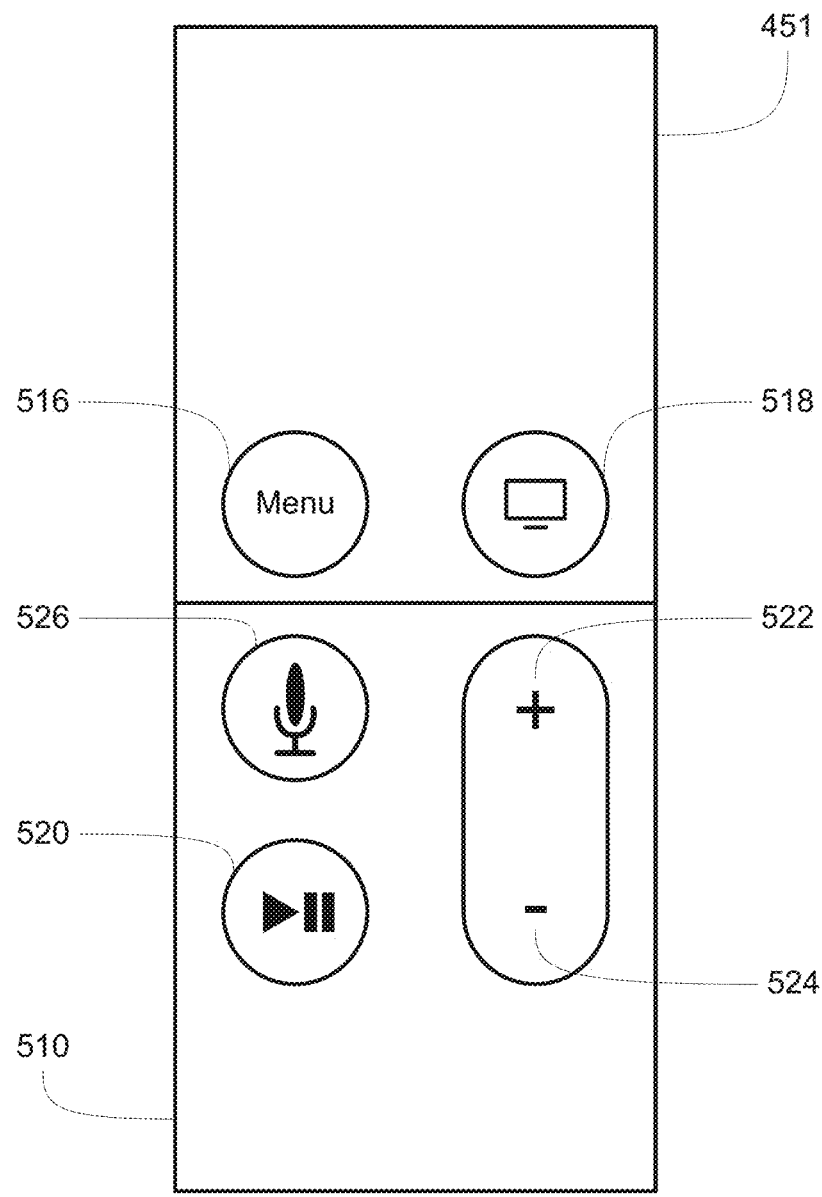

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
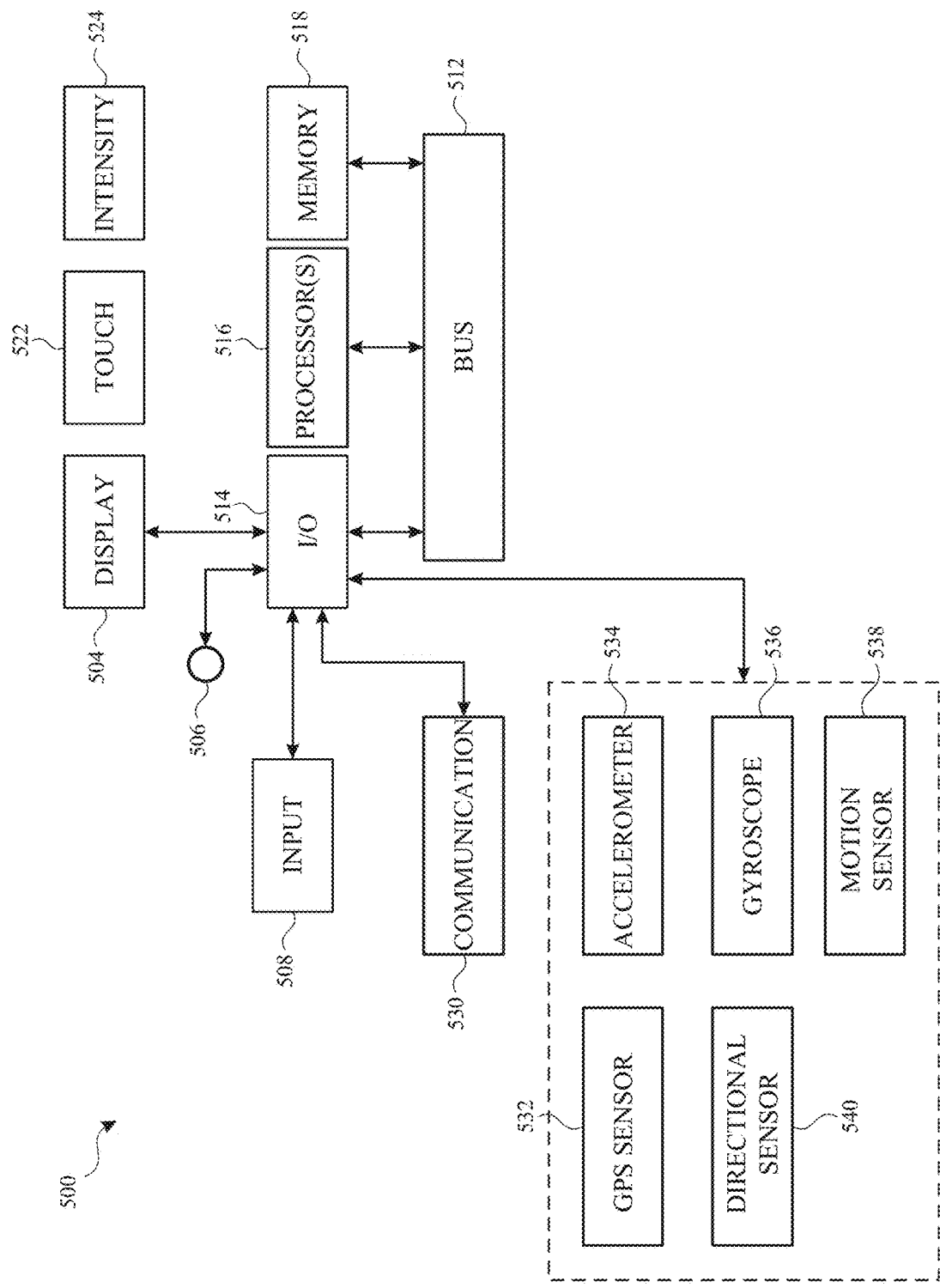

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" (U.S. Application No. 62/822,952, filed Mar. 24, 2019), "User Interfaces For a Media Browsing Application" (U.S. Application No. 62/922,948, filed Mar. 24, 2019), and "User Interface Specific to Respective Content Items" (U.S. Application No. 62/822,066, filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

Brackets

Users may wish to view representations of events arranged in a multi-level hierarchy, e.g., a bracket. In some circumstances, users interact with the hierarchy, such as panning, zooming, scrolling, or using some other input to change the level in the hierarchy or the information displayed from the hierarchy. In response to an input corresponding to a request to change information displayed in the hierarchy, the electronic device updates the presentation of information from the hierarchy. Providing efficient ways of interacting with a multi-level hierarchy of information may improve the user's experience with the electronic device and reduce the number of inputs needed to view information, e.g., about the events included in a bracket, thereby reducing power usage and improving the battery life of the electronic device.

FIGS. 6A-6I illustrate examples of an electronic device presenting representations of information arranged in a hierarchy, e.g., events arranged in a bracket, in accordance with some embodiments of the disclosure. The embodiments in these figures are used to illustrate the processes described below, including the processes described with reference to FIG. 7.

Although FIGS. 6A-6I illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6I.

Figure 6B:
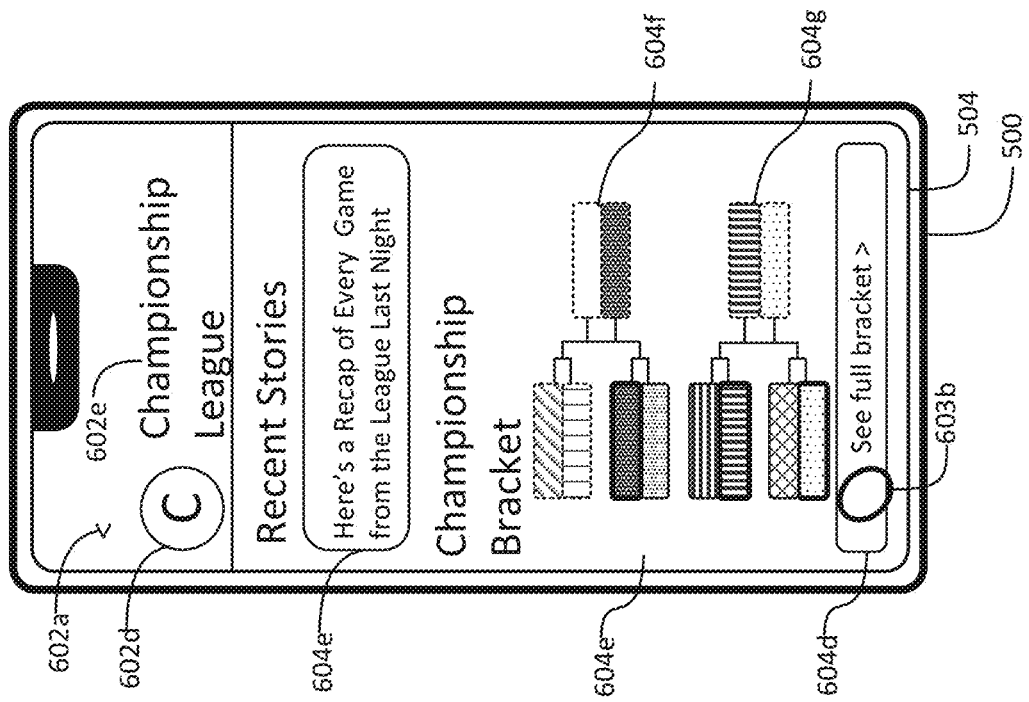
Figure 6A:
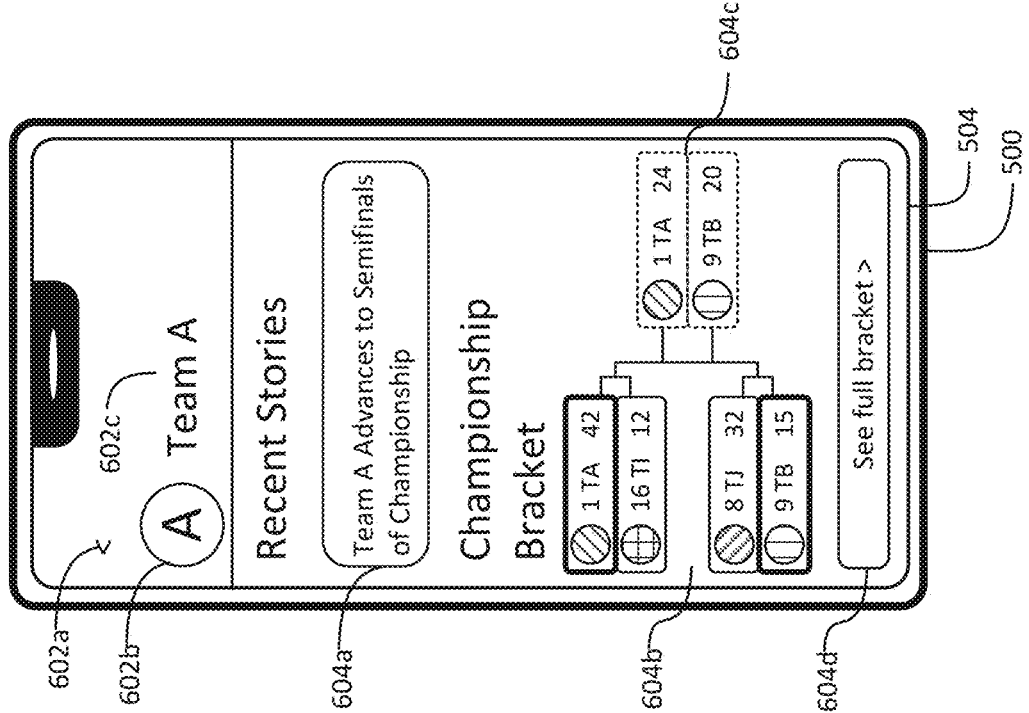

FIG. 6A illustrates an example team feed user interface in a news application. In some embodiments, the electronic device 500 displays the user interface in FIG. 6A in response to receiving an input selecting a link or option to display the team feed user interface. In some embodiments, the team feed user interface includes representations of content items (e.g., news content items) related to a respective sports team, such as Team A in this example. In some embodiments, the content items include articles, videos, audio content, and/or social media posts.

As shown in FIG. 6A, the team feed user interface includes a selectable option 602a that, when selected, causes the electronic device 500 to navigate back to a previously-displayed user interface, a logo 602b corresponding to Team A, an indication 602c that the user interface is the Team A team feed user interface, a representation 604a of an article related to Team A, a portion 604b of a bracket for a league including Team A, and an option 604d that, when selected, causes the electronic device 500 to display the full bracket. As shown in FIG. 6A, the portion 604b of the bracket includes a representation 604c of the latest game in the league in which Team A participated.

In some embodiments, the electronic device displays team feeds for other teams in the same league as Team A. In some embodiments, these team feeds include different portions of the bracket that include the latest games in which the respective team participated, which are optionally different from the portion 604b of the bracket included in the team feed for Team A. For example, a team feed for Team D would include a portion of the bracket including the latest game in which Team D played, which could be different from the portion 604b of the bracket shown in FIG. 6A. In some embodiments, the team feed for Team D includes selectable option 604d that, when selected, causes the electronic device 500 to display the full bracket. In some embodiments, the electronic device 500 displays the same portion of the bracket in response to detecting selection of option 604d regardless of the team feed in which option 604d was displayed. In some embodiments, in response to detecting selection of option 604d displayed in the Team A team feed, the electronic device 500 presents the full bracket scrolled to the latest game in which Team A played and in response to detecting selection of option 604d displayed in the Team D team feed, the electronic device 500 presents the full bracket scrolled to the latest game in which Team D played, which is optionally a different scroll location from the latest game in which team A played. In some embodiments, in response to detecting selection of option 604d in FIG. 6A, the electronic device 500 displays the bracket as shown in FIG. 6C.

In some embodiments, while displaying the Team A team feed, the electronic device receives an input corresponding to a request to scroll the Team A team feed user interface. In some embodiments, in response to the input, the electronic device 500 scrolls the Team A team feed user interface, including displaying representations of other content items related to Team A.

FIG. 6B illustrates an example league feed user interface in a news application. In some embodiments, the electronic device 500 displays the user interface in FIG. 6B in response to receiving an input selecting a link or option to display the league feed user interface. In some embodiments, the league feed user interface includes representations of content items (e.g., news content items) related to a respective sports league, such as Championship League in this example. In some embodiments, the content items include articles, videos, audio content, and/or social media posts.

As shown in FIG. 6B, the league feed user interface includes a selectable option 602a that, when selected, causes the electronic device 500 to navigate back to a previously-displayed user interface, a logo 602d corresponding to Championship League, an indication 602e that the user interface is the Championship League league feed user interface, a representation 604e of an article related to Championship League, a portion 604e of a bracket for Championship League, and an option 604d that, when selected, causes the electronic device 500 to display the full bracket. As shown in FIG. 6B, the portion 604b of the bracket includes representations 604f and 604g of the latest games scheduled and/or occurring in the league.

In some embodiments, while displaying the Championship League league feed, the electronic device receives an input corresponding to a request to scroll the league feed user interface. In some embodiments, in response to the input, the electronic device 500 scrolls the league feed user interface, including displaying representations of other content items related to Championship League.

As shown in FIG. 6B, the electronic device 500 receives an input (e.g., via contact 603b) selecting option 604d. In response to the input illustrated in FIG. 6B, the electronic device 500 displays the user interface illustrated in FIG. 6C, which includes the Championship League bracket.

FIG. 6C illustrates an example of the electronic device 500 displaying a league bracket in response to the input illustrated in FIG. 6B. In some embodiments, the electronic device 500 displays the user interface illustrated in FIG. 6C in response to receiving an input selecting option 604d in FIG. 6A.

In some embodiments, the user interface in FIG. 6C includes a selectable option 602a that, when selected, causes the electronic device 500 to navigate back in the user interface. For example, if the electronic device 500 displays the user interface in FIG. 6C in response to the input illustrated in FIG. 6B, the electronic device 500 displays the user interface in FIG. 6B in response to detecting selection of option 602a. As another example, if the electronic device 500 displays the user interface in FIG. 6C in response to detecting selection of option 604d in FIG. 6A, the electronic device 500 displays the user interface in FIG. 6A in response to detecting selection of option 602a.

In some embodiments, the user interface in FIG. 6C further includes an indication 606 of the Championship League Bracket (e.g., shortened to "League Bracket"), a plurality of options 608a through 608d for navigating rounds of the championship included in the bracket, and representations 610, 612, and 614 of games included in the league. In FIG. 6C, the electronic device 500 displays representations 610 of games included in round 1, representations 612 of games included in round 2, and representations 614 of games included in round 3. As shown in FIG. 6C, options 608a through 608c, corresponding to rounds 1, 2, and 3 of the championship, are displayed with a different appearance from option 608d to indicate that representations 610, 612, and 614 correspond to games in rounds 1, 2, and 3.

As shown in FIG. 6C, representations 610 are displayed at a first view level that includes representations of the teams in each game as team colors and an indication of which team won each game if the game has already been played. For example, representation 610a includes a representation 616a of a first team including the team color of the first team and a representation 616b of a second team including the team color of the second team. In this example, the representation 610a includes a bold indicator around the representation 616a of the first team, indicating that the first team won the game corresponding to representation 610a. As shown in FIG. 6C, the other representations 610 include similar elements to the elements of representation 610a. In some embodiments, the electronic device 500 uses a different visual characteristic to denote which team won the game, such as a glow effect or displaying the representation of the winning team in a different (e.g., larger) size from the representation of the losing team.

In FIG. 6C, representations 612 and 614 are displayed at a different view level that includes colors for each team, the seed number for each team, and an abbreviated indication of the name of each team. In some implementations, each representation 612 and 614 displays more or less content depending on the number of columns and rows of the hierarchy, e.g., bracket, are in view. A representation at a first view level may show more content then a second representation at a second view level. For example, representation 612a includes a portion 620a corresponding to a first team and a portion 620b corresponding to a second team. As shown in FIG. 6C, portion 620a of representation 612a includes a color 618a corresponding to the first team, an indication 618b of the first team's seed number in the championship, and an abbreviated indication 618a of the name of the first team. In some embodiments, the electronic device 500 displays representations of games that are ongoing in a different style from games that have concluded. For example, representation 612a corresponds to an ongoing or upcoming game, so the outlines around portions 620a and 620b have the same visual characteristics (e.g., a dashed line). As another example, representation 612b corresponds to a concluded game, so portion 620c has an outline that is different from the outline around portion 620d indicating that the team corresponding to portion 620c won the game represented by representation 612b. As another example, representation 614a corresponds to an upcoming game between a team corresponding to portion 622b and an unknown team. Because the team corresponding to portion 622a is unknown, for example, portion 622a of representation 614a is blank. In some embodiments, the electronic device 500 displays an indication in portion 622a that the team is to be determined. In some embodiments, the electronic device 500 displays representations of upcoming games with a different appearance from representations of ongoing games.

Thus, as shown in FIG. 6C, in some embodiments, while displaying the bracket at the zoom level illustrated in FIG. 6C, the electronic device 500 displays representations 610, 612, and 614 of games with different levels of zoom. For example, representations 610 are at a different view level than representations 612 and 614. In some embodiments, the electronic device 500 is able to present more than three rounds of the bracket concurrently. In some embodiments, the electronic device 500 displays representations with more than two different levels of zoom concurrently. In some embodiments, the electronic device 500 displays the representations 610, 612, and 614 of games at the same view level. The sizes and view levels of the representations depend on the number of columns and rows of the hierarchy that are in view of a display as well as the display size of the electronic device on which the hierarchy is being viewed.

In some embodiments, the bracket shown in FIG. 6C includes representations 610, 612, and 614 of the entire set of games occurring in the first, second, and third rounds of the championship. In this case, in some embodiments, the bracket is not vertically scrollable because there is no additional content to be displayed. In some embodiments, the bracket shown in FIG. 6C includes representations 610, 612, and 614 of a subset of all games occurring in the first, second, and/or third rounds of the championship. In this case, in some embodiments, the bracket is vertically scrollable to reveal representations of other games in the first, second, and/or third round of the championship. For example, in response to receiving an input corresponding to a request to scroll up or down (e.g., a swipe input), the electronic device 500 displays representations of additional games in the first, second, and/or third rounds of the championship above, below, and/or in place of one or more of the representations 610, 612, and/or 614 displayed in FIG. 6C. In some embodiments, the representations the electronic device 500 displays in response to receiving the scrolling input have the same view level as the representations 610, 612, and 614 displayed prior to receiving the scrolling input in the same respective rounds. For example, representations of games in round 1 revealed in response to scrolling have the same view level as representations 610 illustrated in FIG. 6C and representations of games in rounds 2 and 3 revealed in response to scrolling have the same view level as representations 612 and 614.

As shown in FIG. 6C, the electronic device 500 receives an input (e.g., via contacts 603c and 603d) corresponding to a request to change the view level of the bracket. For example, the input illustrated in FIG. 6C corresponds to a request to zoom the bracket in. In response to receiving the input illustrated in FIG. 6C, the electronic device 500 updates the view level of the bracket as shown in FIG. 6D.

Figure 6D:
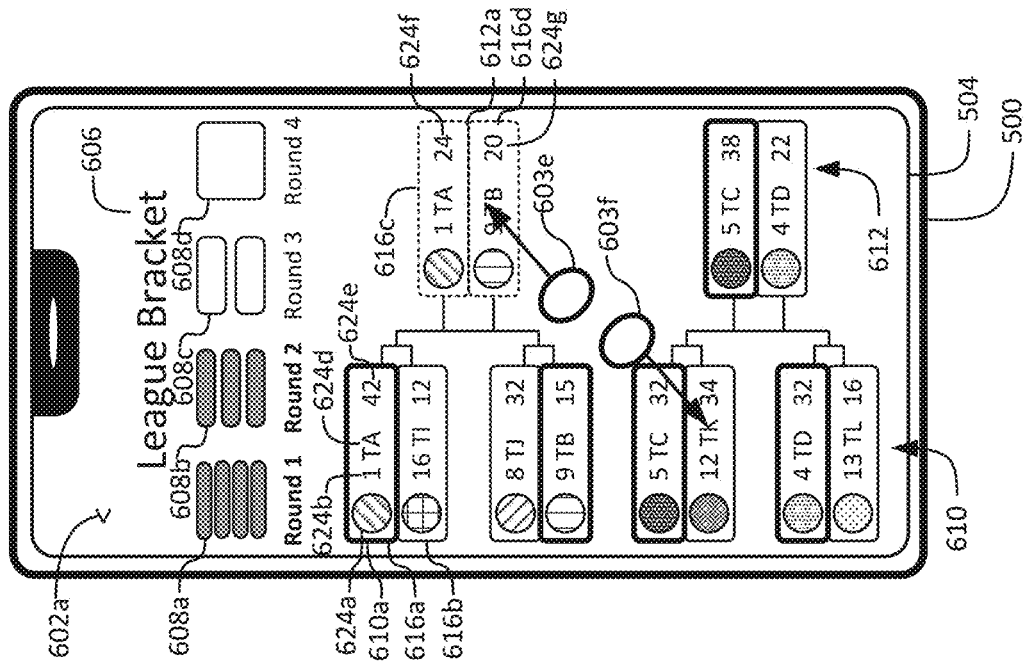
Figure 6C:
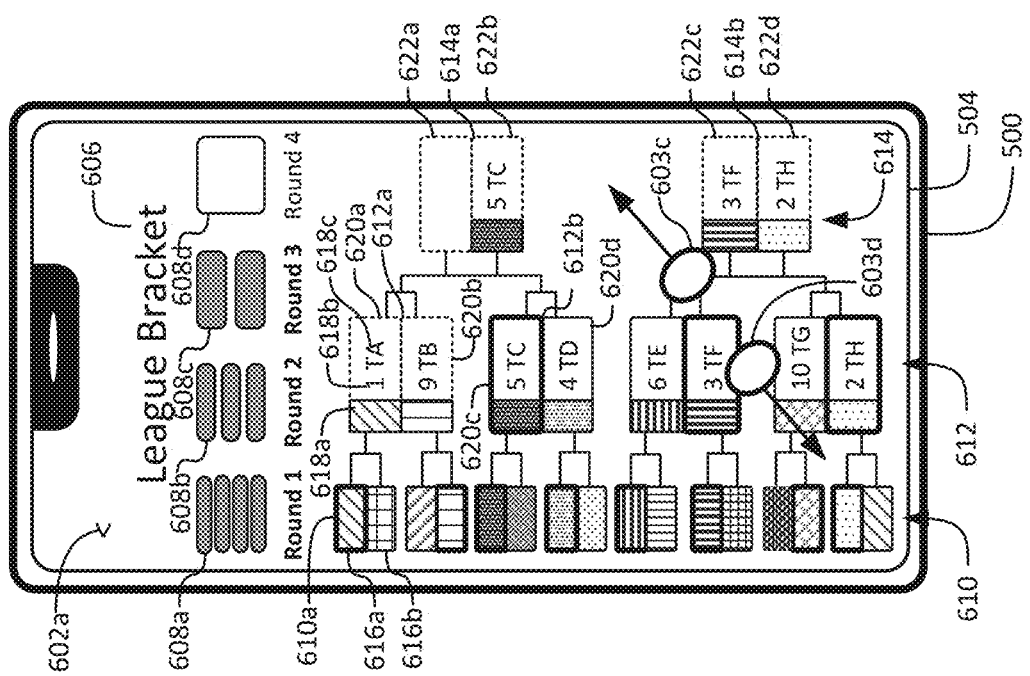

FIG. 6D illustrates an example of the electronic device 500 displaying the bracket zoomed in compared to the view level in FIG. 6C in response to the input illustrated in FIG. 6C. In this example, the change in view level corresponds to displaying fewer columns of the hierarchy on the electronic device. As shown in FIG. 6B, a user zooming the bracket in causes the electronic device 500 to display representations 610 of games in round 1 of the championship and representations 612 of games in round 2 of the championship without displaying representations of games in round 3 of the championship. A user may initiate this zoom by a number of user inputs including pinch and zoom or tapping and dragging on representations in the navigation bar 608. Thus, for example, the electronic device 500 displays games from fewer rounds in FIG. 6D than was the case in FIG. 6C in response to the input to zoom the bracket in. Also, in FIG. 6D, the electronic device 500 displays representations 610 of fewer games in round 1 and representations 612 of fewer games in round 2 in FIG. 6D than was the case in FIG. 6C.

In some embodiments, in response to receiving an input corresponding to a request to scroll the bracket vertically, the electronic device 500 reveals representations 610 and/or 612 of other games in round 1 and/or round 2, respectively, above, below, or in place of one or more representations 610 and/or 612 illustrated in FIG. 6D. In some embodiments, the representations revealed in response to the input corresponding to the request to vertically scroll have the same view level as the representations 610 and 612 displayed prior to receiving the input corresponding to the request to vertically scroll.

In some embodiments, in response to receiving the input corresponding to the request to zoom into the bracket, the electronic device 500 displays fewer representations and displays the representations 610 and 612 at a larger size, with a different style, and/or with more information than was the case before the electronic device 500 received the input. For example, representation 610a includes a first portion 616a corresponding to a first team included in the game corresponding to representation 610a and a second portion 616b corresponding to a second team included in the game. As shown in FIG. 6D, the first portion 616a includes an indication 624a of a team color associated with the first team, an indication 624b of the seed of the first team in the championship, an abbreviated indication 624d of the name of the first team (e.g., "TA," which is short for "Team A"), and an indication 624e of the number of points scored by the first team in the game. As shown in FIG. 6D, because the first team won the game corresponding to representation 610a, the first portion 616a of the representation 610a corresponding to the first team is outlined in a bold outline, whereas the second portion 616b of the representation 610b corresponding to the second team is outlined in a less bold outline. Other visual characteristics can be used to indicate the winning team in each game in some embodiments, such as a glow effect, and/or changing the relative sizes of the representations of the teams within the representations 610 and 612 of the games. The second portion 616b of the representation 610a includes similar elements as the elements of the first portion 616a of the representation 610a. Other representations 610 and 612 include similar elements as the elements of representation 610a corresponding to the games and teams represented by representations 610 and 612.

Representation 612a corresponds to an ongoing game, so the outlines around the first portion 616c and the second portion 616d of the representation 612a have a different style from the outlines around representation 610a, which corresponds to a completed game. For example, in FIG. 6D the outlines around representation 612a are dashed and a uniform thickness around portion 616c and portion 616d because the final outcome of the game has not yet been determined. Moreover, for example, the indication 624f of the number of points scored by the team corresponding to portion 616c is an indication of the number of points scored so far, rather than an indication of the final score. In some embodiments, as the game progresses, the electronic device 500 updates the representation 612a of the game to continue to reflect the current score of the game. In some embodiments, portion 616d includes similar elements as portion 616c, including an indication 624g of the number of points scored by the team corresponding to portion 616d so far.

In some embodiments, because the bracket as displayed in FIG. 6D includes representations 610 of games occurring in round 1 and representations 612 of games occurring in round 2 without including representations of games occurring in rounds 3 or 4, the electronic device 500 displays the option 608a corresponding to round 1 and the option 608b corresponding to round 2 with more visual emphasis than representation 608c corresponding to round 3 and representation 608d corresponding to round 4. For example, options 608a and 608b are displayed with darker colors and bold text compared to options 608c and 608d. In some embodiments, other characteristics for changing the visual emphasis are possible.

Figure 6F:
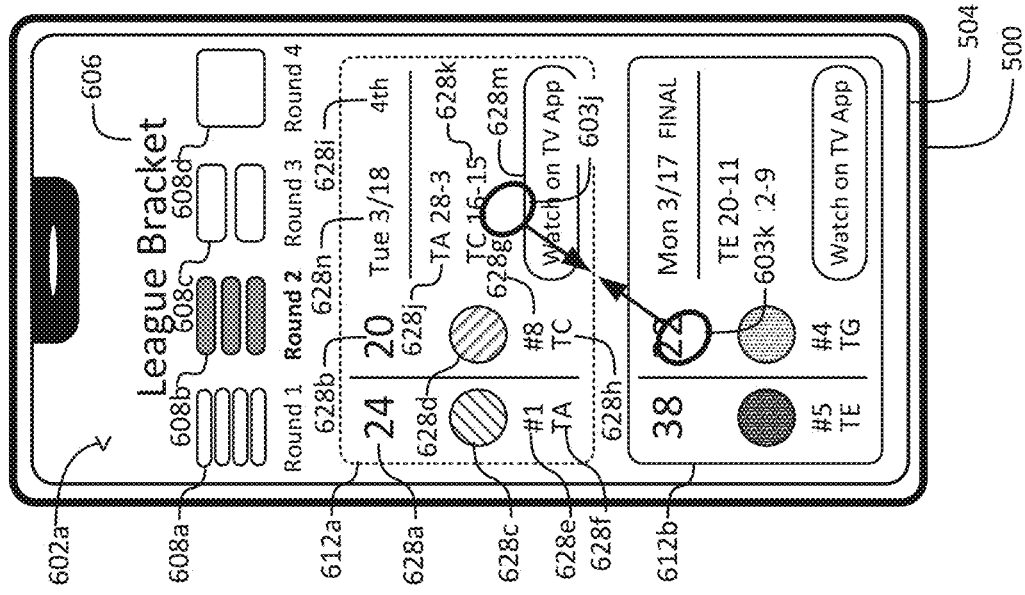
Figure 6E:
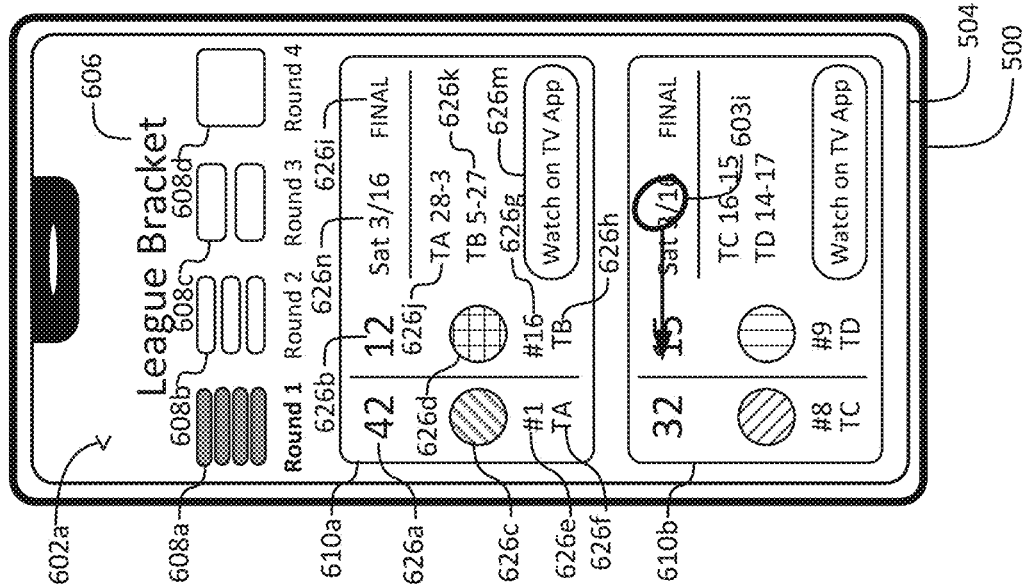

As shown in FIG. 6D, the electronic device 500 receives an input (e.g., via contacts 603e and 603f) corresponding to a request to zoom the bracket in. In response to the input in FIG. 6D, the electronic device 500 updates the bracket as shown in FIG. 6E. If the electronic device 500 were to receive an input corresponding to a request to zoom out, the electronic device 500 would display the user interface illustrated in FIG. 6C in some embodiments.

FIG. 6E illustrates an example of the electronic device 500 displaying the bracket zoomed in response to the input illustrated in FIG. 6D. In FIG. 6E, the electronic device 500 displays representations 610a and 610b of games in round 1, which includes games from fewer rounds than was the case in FIG. 6D. Because the electronic device 500 displays representations 610a and 610b of games occurring in round 1 without including representations of games occurring in rounds 2, 3, or 4, the electronic device 500 displays option 608a corresponding to round 1 with more visual emphasis than options 608b through 608d corresponding to rounds 2 through 4. For example, option 608a is displayed with darker colors and bold text compared to options 608b through 608d. In some embodiments, other characteristics for changing the amount of visual emphasis are possible.

Additionally, in some embodiments, in FIG. 6E, the electronic device 500 displays representations of fewer games in round 1 than was the case in FIG. 6D. In some embodiments, as described in more detail above, in response to receiving an input corresponding to a request to vertically scroll the bracket, the electronic device 500 updates the bracket to include one or more representations of games in the round 1 above, below, and/or in place of one or more of representations 610a and 610b. In some embodiments, the electronic device 500 displays the representations of games revealed in response to the scrolling input with the same view level as the representations 610a and 610b illustrated in FIG. 6E.

At the view level illustrated in FIG. 6E, representations 610a and 610b have a larger size, more information, and a different appearance than the representations 610 in FIG. 6D. For example, representation 610a includes an indication 626a of the number of points scored by a first team in the game, an indication 626b of a number of points scored by the second team in the game, an indication 626c of the team colors for the first team, an indication 626d of the team colors for the second team, an indication 626e of the seed for the first team, an indication 626f of the name of the first team, an indication 626g of the seed of the second team, an indication 626h of the seed of the second team, an indication 626n of the date of the game, an indication 626i that the score for the game is the final score (e.g., the game has concluded), an indication 626j of the first team's record for the season, an indication 626k of the second team's record for the season, and an option 626m that, when selected, causes the electronic device 500 to play the game. In some embodiments, in response to detecting selection of option 626m, the electronic device 500 plays the game corresponding to representation 610a. In some embodiments, the electronic device 500 plays the game using a content delivery application different from the application in which the electronic device 500 displays the bracket. In some embodiments, the electronic device 500 plays the game using the same application as the application used to display the bracket. In some embodiments, representation 610b of a different game includes elements similar to the elements of representation 610a.

As shown in FIG. 6E, the electronic device 500 detects a horizontal swipe input (e.g., movement of contact 603i). In response to receiving the horizontal swipe input, the electronic device 500 updates the user interface to include representations of games occurring in the round of the championship after the round that is currently displayed, as shown in FIG. 6F. If the electronic device 500 were to receive an input corresponding to a request to zoom out, the electronic device 500 would display the user interface shown in FIG. 6D in some embodiments.

FIG. 6F illustrates the electronic device 500 displaying representations 612a and 612b of games included in round 2 of the championship in response to the input illustrated in FIG. 6E. In some embodiments, the electronic device 500 would display the user interface illustrated in FIG. 6F in response to receiving an input corresponding to selection of option 608b while displaying representations of games in a round other than round 2 at the view level shown in FIG. 6F. In FIG. 6E, the electronic device 500 displayed the representations 610a and 610b of games in the first round of the championship at the same view level as the view level of representations 612a and 612b in FIG. 6F.

As shown in FIG. 6F, the electronic device 500 displays option 608b with more visual emphasis than options 608a, 608c, and 608d because the electronic device 500 is currently displaying representations 612a and 612b of games in round 2 without displaying representations of games in rounds 1, 3, or 4. For example, option 608b is displayed with darker colors and bold text compared to options 608a, 608c, and 608d. In some embodiments, other techniques for visually emphasizing option 608b compared to options 608a, 608c, and 608d are possible.

As shown in FIG. 6F and as described above, the representations 612a and 612b are displayed with the same view level as the representations 610a and 610b illustrated in FIG. 6E. Thus, for example, representations 612a and 612b in FIG. 6F have the same or similar appearances, sizes, and types of information as representations 610a and 610b in FIG. 6E. For the sake of brevity, those details will not be repeated here. Because the game corresponding to representation 612a is ongoing and has not concluded, indications 618a and 618b of points scored by the first and second teams, respectively, are indications of the current number of points per team, rather than the final score and representation 612a includes an indication 628i of the current quarter of the game, rather than an indication that the game is final. In some embodiments, as the game continues, the electronic device 500 updates the indications 628a and 628b of the number of points and the indication 628i of the current portion of the game to reflect the current score and current portion, respectively. In some embodiments, if the game corresponding to representation 612a has not started yet, the representation 612a does not include indications 628a and 628b of points or indicates the number of points for each team as zero and does not include an indication 628i of the current portion of the game or instead includes an indication that the game is "upcoming," "scheduled," or "future." In some embodiments, if a game is upcoming, the representation of the game includes an indication of the date on which the game is scheduled, similar to indication 628n in representation 612a. In some embodiments, if the upcoming game is not yet scheduled, the representation does not include an indication of the date of the game or includes an indication that the date of the game is to be determined. In some embodiments, if one or more teams to play in an upcoming game are not yet decided, the representation of the game excludes team colors, team names, team seeds, and/or team records for the one or more teams not yet determined.

In FIG. 6F, the electronic device 500 receives an input (e.g., via movement of contacts 603j and 603k) corresponding to a request to zoom the bracket out. In response to the input illustrated in FIG. 6F, the electronic device 500 updates the user interface as shown in FIG. 6G.

Figure 6H:
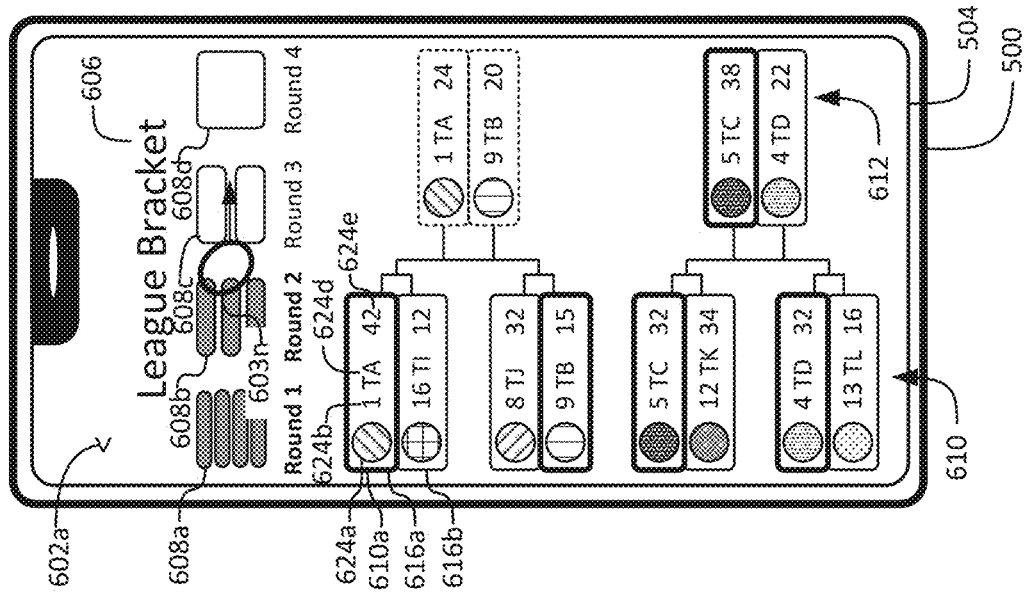
Figure 6G:
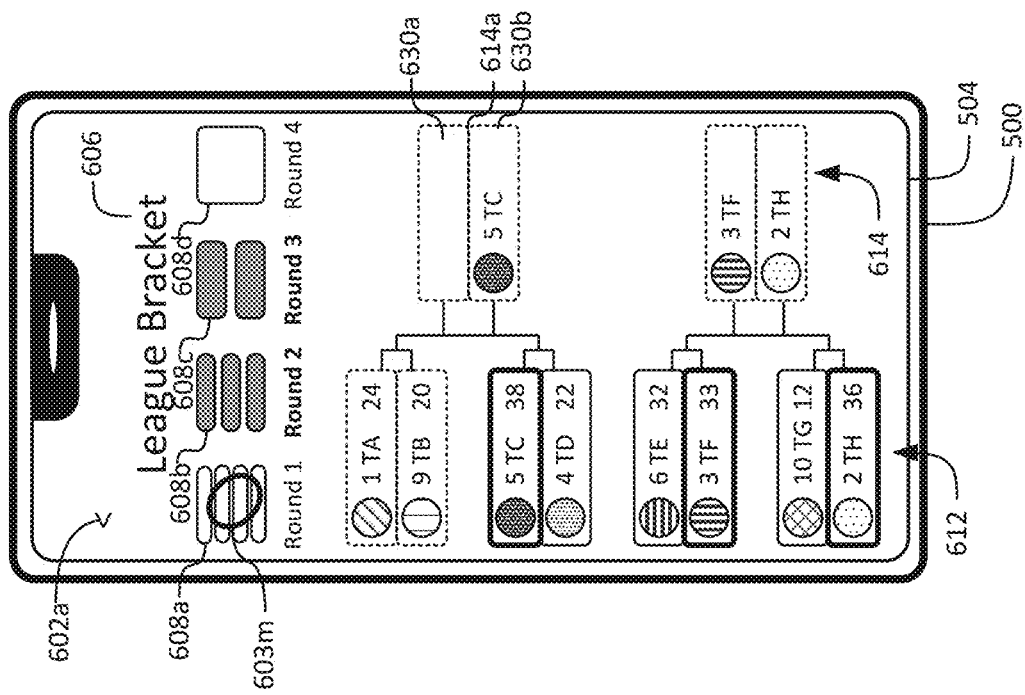

FIG. 6G illustrates the electronic device 500 displaying the bracket at an updated view level in response to the input illustrated in FIG. 6F. In some embodiments, the view level in FIG. 6G is the same as the view level described above with reference to FIG. 6D, so the representations 612 of games in the second round and representations 614 of games in the third round have the same size, format, and types of information as the representations in FIG. 6D. FIG. 6G includes a representation 614a of an upcoming game for which one of the teams is not yet determined. Representation 614a includes a portion 630a corresponding to the to-be-determined team and a portion 630b corresponding to another team that is already determined. Thus, in some embodiments, portion 630a is blank, indicating that the team is not yet determined. In some embodiments, rather than portion 630a being blank, portion 630a includes an indication that the team is to be determined.

Because FIG. 6G includes representations 612 of games in round 2 and representations 614 of games in round 3, the electronic device 500 displays options 608b and 608c corresponding to rounds 2 and 3 with more visual emphasis than options 608a and 608d corresponding to rounds 1 and 4, as described in more detail above.

As described above, in some embodiments, if there are additional games in rounds 2 and/or 3 of the championship not displayed in FIG. 6G, the electronic device 500 scrolls the bracket in response to a scroll input (e.g., a vertical swipe) to reveal representations of other games in rounds 2 and/or 3.

As shown in FIG. 6G, the electronic device 500 receives an input (e.g., via contact 603m) corresponding to selection of option 608a. In some embodiments, in response to the input, the electronic device 500 displays the user interface illustrated in FIG. 6H. In some embodiments, if the electronic device 500 received a horizontal swipe input to the right while displaying the user interface in FIG. 6G, the electronic device 500 would display the user interface illustrated in FIG. 6H.

FIG. 6H illustrates the electronic device 500 displaying the bracket updated in response to the input illustrated in FIG. 6G. In some embodiments, the user interface illustrated in FIG. 6H is the same as the user interface in FIG. 6D. For the sake of brevity, the description will not be repeated here.

In FIG. 6H, the electronic device 500 receives an input (e.g., via movement of contact 603n) directed to options 608a through 608d including a horizontal swipe (or tap and drag) that corresponds to a request to change the number of rounds of the championship displayed in the bracket. In response to the input in FIG. 6H, the electronic device 500 updates the bracket as shown in FIG. 6I. In some embodiments, if the input had been in the opposite direction, corresponding to a request to display fewer rounds of the championship in the bracket, the electronic device 500 would display the user interface in FIG. 6E or 6F instead of displaying the user interface in FIG. 6I.

FIG. 6I illustrates an example of the electronic device 500 updating the bracket in response to the input illustrated in FIG. 6H. As shown in FIG. 6I, the electronic device 500 displays more rounds of the championship in the bracket in FIG. 6I than the electronic device 500 displayed in the bracket in FIG. 6H in response to the input in FIG. 6H. Because the electronic device 500 displays representations 610, 612, and 614 of games in rounds 1, 2, and 3 without displaying representations of games in round 4 in FIG. 6I, the electronic device 500 displays options 608*a*, 608*b*, and 608*c* with more visual emphasis than the amount of visual emphasis with which the electronic device 500 displays option 608*d*.

Figure 6J:
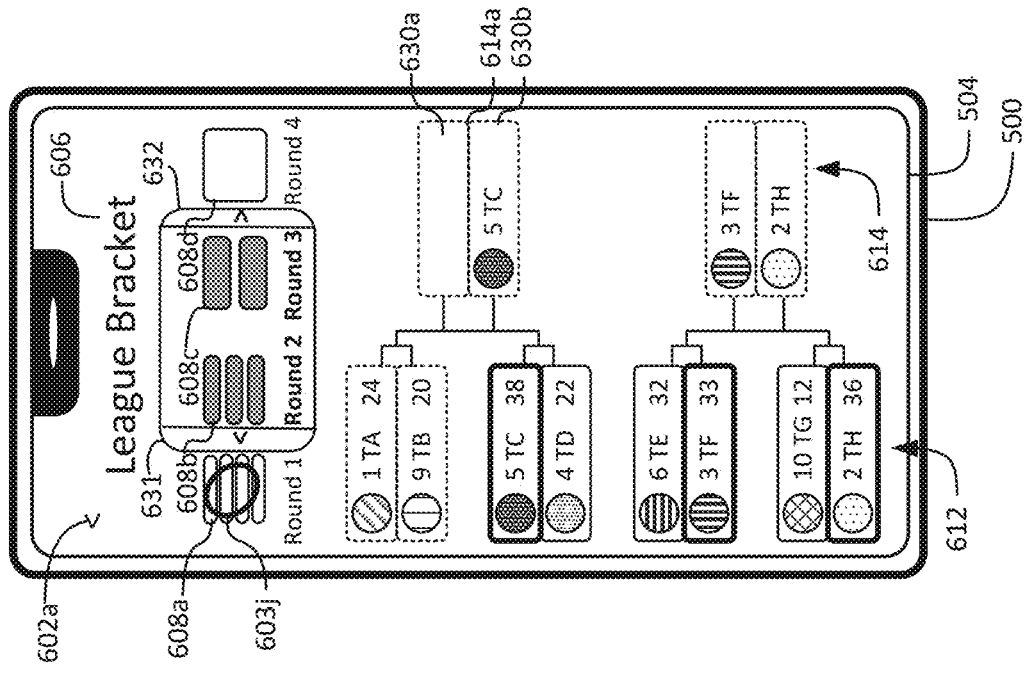
Figure 6I:
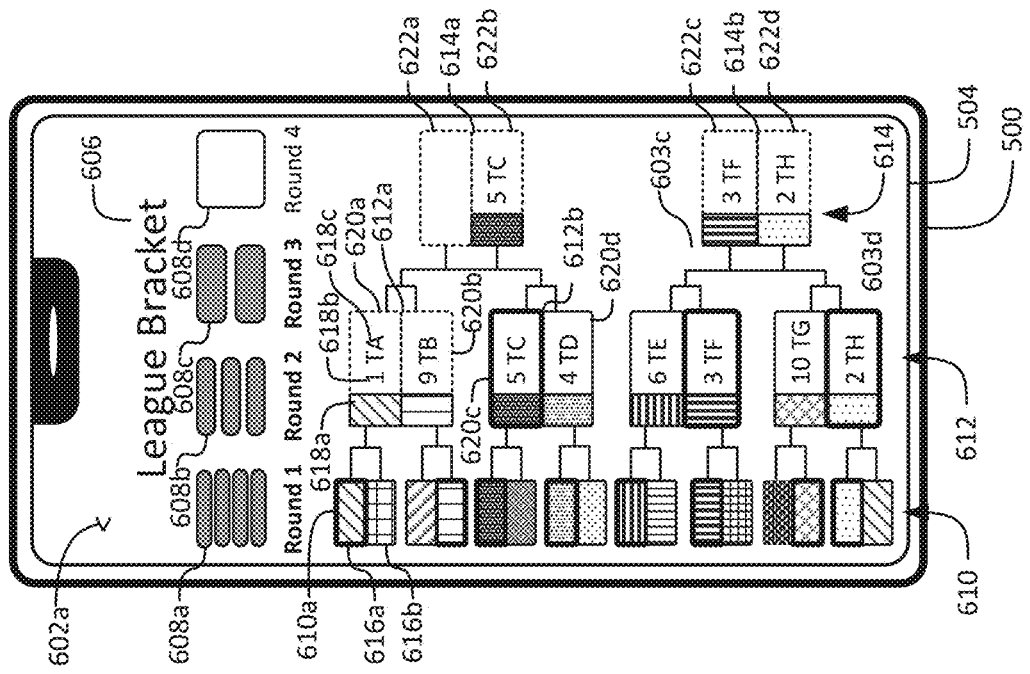

FIGS. 6J-6M illustrate additional interactions with the navigation options 608*a* through 608*d* according to some embodiments. As shown in FIG. 6J, in some embodiments, the electronic device 500 displays navigation options 631 and 632 adjacent to options 608*b* and 608*c* that correspond to the representations of events currently displayed in the bracket. For example, while the bracket includes representations 612 of events in round 2 and representations 614 of events in round 3, the electronic device 500 displays navigation option 631 to the left of option 608*b* corresponding to round 2 and navigation option 632 to the right of option 608*c* corresponding to round 3. In some embodiments, the electronic device 500 indicates that events included rounds 2 and 3 are represented in the bracket by outlining options 608*b* and 608*c*, as shown in FIG. 6J. Additionally or alternatively, in some embodiments, the electronic device 500 displays options 608*b* and 608*c* with a different background color than options 608*a* and 608*d* to indicate that options 608*b* and 608*c* correspond to the representations 612 and 614 currently displayed in the bracket. Additionally or alternatively, in some embodiments, the electronic device 500 displays options 608*b* and 608*c* with a different color than the color of options 608*a* and 608*d*, as shown in FIG. 6J.

As shown in FIG. 6J, the electronic device 500 detects selection (e.g., by contact 603*j*) of option 608*a*, which corresponds to one of the rounds of the championship not currently represented by the bracket. In response to the input illustrated in FIG. 6J, the electronic device 500 updates the bracket to display representations of events in the first round of the championship corresponding to option 608*a*, as shown in FIG. 6K. Additionally, as shown in FIG. 6K, in response to the input illustrated in FIG. 6J, the electronic device 500 ceases display of the representations 612 of events in round 2 of the championship corresponding to option 608*b* and representations 614 of events in round 3 of the championship corresponding to option 608*c*.

FIG. 6K illustrates an example of the electronic device 500 displaying representations 610*a* and 610*b* of events in round 1 of the championship in response to receiving the input illustrated in FIG. 6J. As described above and as shown in FIG. 6K, the electronic device 500 ceases display of representations of events from rounds 2 and 3 in the bracket in response to the input in FIG. 6J. As shown in FIG. 6K, representations 610*a* and 610*b* are displayed at a larger size and/or with more detail than the size and/or detail with which representations 612 and 614 were displayed in FIG. 6J. In some embodiments, the electronic device 500 displays the representations 610*a* and 610*b* at a larger size and/or with more detail in FIG. 6K because the electronic device 500 is displaying representations of events from a smaller number of rounds of the championship. Additionally, as shown in FIG. 6K, the electronic device 500 updates the navigation options to display option 608*a* with the visual characteristics of being selected and options 608*b* and 608*c* with the visual characteristics of not being selected and updates options 631 and 632 to be displayed adjacent to option 608*a*.

In some embodiments, if the electronic device 500 had detected selection of a different option, such as option 608*d*, the electronic device 500 would instead display representations of events in the round corresponding to option 608*d* (e.g., round 4). In some embodiments, if the electronic device 500 had instead detected selection of option 608*b* or option 608*c* while displaying the representations 612 and 614 illustrated in FIG. 6J, the electronic device 500 would display representations of events corresponding to the selected option at the level of zoom/detail shown in FIG. 6K and cease display of representations of events from the other round. In some embodiments, in response to detecting selection of one of the options 608*a* through 608*d* in the navigation bar, the electronic device 500 transitions to displaying representations of events in the round corresponding to the selected navigation option without displaying representations of events in other rounds irrespective of the number of rounds represented by the bracket at the time the electronic device received the input. Additionally, in some embodiments, if the electronic device 500 had received selection of a different option, the electronic device 500 would display the selected option with the visual characteristics of being selected (e.g., the visual characteristics of option 608*a* in FIG. 6K) and would display the other options with the visual characteristics of not being selected (e.g., the visual characteristics of options 608*b* through 608*d* in FIG. 6K). Additionally, in some embodiments, if the electronic device 500 had received selection of a different option, the electronic device 500 would display navigation options 631 and 632 adjacent to the selected option.

As shown in FIG. 6K, the electronic device 500 detects a swipe input (e.g., movement of contact 603*k*) starting at navigation option 632. In some embodiments, in response to detecting the input shown in FIG. 6K, the electronic device 500 updates the bracket to include representations of events from round 2 corresponding to option 608*b* while maintaining display of representations 610 of events in round 1 corresponding to option 608*a*, as shown in FIG. 6L.

FIG. 6L illustrates an example of the electronic device 500 updating the bracket to include representations 612 from round 2 corresponding to option 608*b* in response to the input illustrated in FIG. 6K. As shown in FIG. 6L and as described in more details below, the electronic device 500 continues to display representations 610 of events in round 1 in response to the input illustrated in FIG. 6K. In some embodiments, the representations 610 and 612 displayed in response to the input in FIG. 6K are displayed at a smaller size and/or with less detail than the size and/or amount of detail with which the electronic device 500 displayed representations 610*a* and 610*b* prior to receiving the input in FIG. 6K. In some embodiments, the electronic device 500 reduces the size and/or amount of detail because the electronic device 500 is displaying representations of events from a greater number of rounds of the championship.

In some embodiments, if the swipe input in FIG. 6K had a larger (e.g., size, speed, or duration) magnitude, the electronic device 500 would update the bracket to include representations of events from a greater number of rounds of the championship. For example, if the swipe input in FIG. 6K had been larger, the electronic device 500 would display representations of events from round 3 of the championship in addition to the representations 610 of events from round 1 and the representations of events 612 from round 2. Additionally, in some embodiments, in response to receiving the larger swipe input, the electronic device 500 would display option 608*c* with the visual characteristic of being selected (e.g., the visual characteristic of options 608a and 608b in FIG. 6L) and would display navigation option 632 to the right of option 608c.

In some embodiments, navigation option 631 functions similarly to option 632. For example, in response to detecting a swipe to the left that includes touchdown of a contact on option 631, the electronic device 500 updates the bracket to include representations of events from a round in the championship corresponding to the option to the left of the options corresponding to rounds of the representations of events the electronic device currently displays. For example, if the electronic device 500 were displaying representations 612 and 614 of events in rounds 2 and 3 as shown in FIG. 6J and receives a swipe input to the left starting with touchdown of a contact on option 631, the electronic device 500 would update the bracket to further include representations 610 of events from round 1. In some embodiments, in response to this input, the electronic device 500 continues to display representations 612 and 614 of events from rounds 2 and 3. In some embodiments, in response to this input, the electronic device 500 reduces the size and/or amount of detail included in the representations of events because the electronic device 500 is displaying representations of events from a greater number of rounds. In some embodiments, in response to this input, the electronic device would display option 608a with the visual characteristic of being selected (e.g., the visual characteristics of option 608b and 608c) and would display option 631 to the left of option 608a.

As shown in FIG. 6L, the electronic device 500 detects a swipe input starting with contact 603l on option 608b. In some embodiments, in response to receiving the input in FIG. 6L, the electronic device 500 updates the bracket to include representations of events in rounds 2 and 3 of the championship and to exclude representations 610 of events in round 1 of the championship, as shown in FIG. 6M.

Figure 6M:
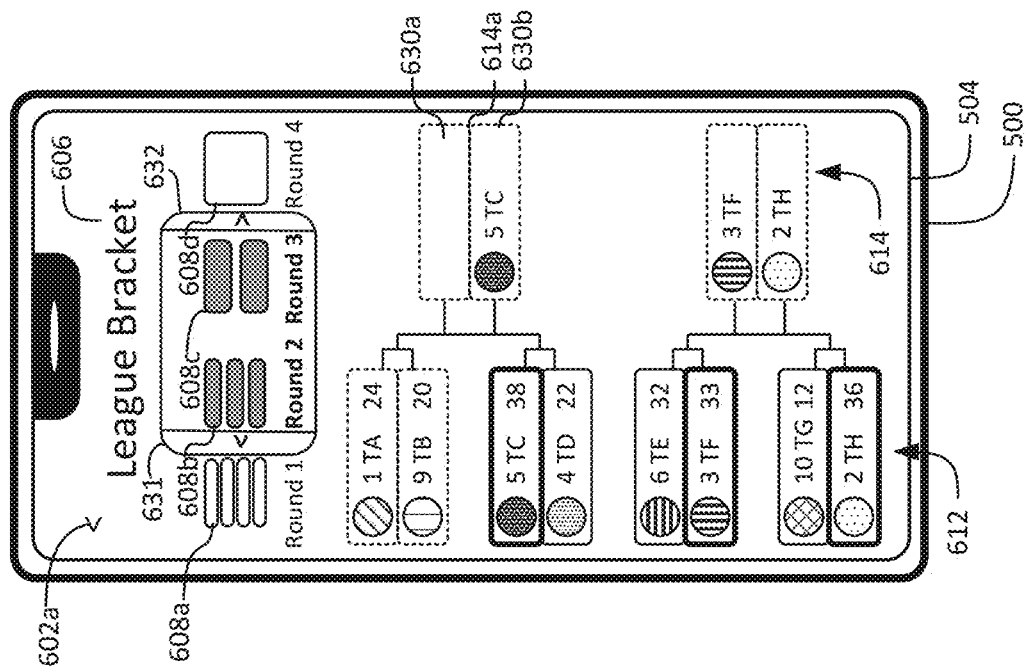

FIG. 6M illustrates an example of the electronic device 500 displaying an updated bracket in response to the input illustrated in FIG. 6L. As shown in FIG. 6M, the updated bracket includes representations 612 of events in round 2 of the championship and representations 614 of events in round 3 of the championship and does not include the representations 610 of events in round 1 of the championship that were displayed in FIG. 6L. In some embodiments, in response to receiving a swipe input directed to the navigation bar, such as the swipe input in FIG. 6L directed to option 608b, the electronic device 500 changes the rounds for which representations of events are displayed while displaying events from the same number of rounds. For example, in FIG. 6L, the electronic device 500 displayed representations 610 and 612 of events from two rounds (rounds 1 and 2) and in FIG. 6M, the electronic device 500 displays representations 612 and 614 from two rounds (rounds 2 and 3). In some embodiments, in response to the input in FIG. 6M, the electronic device 500 updates the navigation bar, including displaying option 608c with the visual characteristic that indicates selection and displaying option 608a with the visual indication that does not indicate selection because representations 614 of events in round 3 are displayed and representations 610 of events in round 1 are not displayed.

In some embodiments, if the swipe input in FIG. 6L had a larger magnitude (e.g., in speed, duration, and/or distance), the electronic device 500 would adjust the rounds shown in the bracket by a larger amount, such as showing representations of events from rounds 3 and 4 without showing representations of events from rounds 1 and 2. Accordingly, in some embodiments, the electronic device 500 would also update the navigation bar to display options 608c and 608d with the visual characteristic indicating selection and to display options 608a and 608b with the visual characteristic not indicating selection. Also, in some embodiments, the electronic device 500 adjusts which rounds are shown in the bracket based on the direction of the swipe input. For example, in response to detecting a swipe input starting on option 608b and moving to the left while the electronic device 500 displays the user interface illustrated in FIG. 6M, the electronic device 500 would update the bracket to include representations of events from rounds 1 and 2 of the championship without including representations of events from rounds 3 and 4 of the championship, such as shown in FIG. 6L. Additionally, in this example, the electronic device 500 would update the navigation bar as shown in FIG. 6L.

In some embodiments, the electronic device 500 adjusts which rounds are shown in the bracket without adjusting how many rounds are shown in the bracket in the manner described with reference to FIGS. 6L-6M in response to a swipe input directed to any location of the navigation bar other than navigation options 631 and 632. For example, if the swipe input illustrated in FIG. 6L started at option 608a or option 608c, the result would be the same as shown in FIG. 6M. In some embodiments, if the swipe input is directed to one of the options that is not selected, such as the input shown in FIG. 6L being directed to option 608c, the electronic device 500 forgoes updating the user interface as shown in FIG. 6M. d FIG. 7 is a flow diagram illustrating a method in which an electronic device presents representations of events arranged in a bracket in accordance with some embodiments of the disclosure. The method 700 is optionally performed at first and/or electronic devices such as device 100, device 300, or device 500 as described above with reference to FIGS. 1A-1B, 2-3, 4A-4B and 5A-5C. Some operations in method 700 are, optionally combined and/or order of some operations is, optionally, changed.

As described below, the method 700 provides ways in which an electronic device displays and facilitates interactions with brackets. Presenting interactive brackets provides a convenient way to browse information about events in a series (e.g., games in a championship), thus reducing the number of inputs needed to browse and view the information, thereby reducing power usage and improving the battery life of the electronic device.

In some embodiments, method 700 is performed at an electronic device (e.g., device 500) in communication with a display generation component and one or more input devices (e.g., a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users.

In some embodiments, method 700 is performed at an electronic device (e.g., 500) in communication with a display generation component (e.g., 504) and one or more input devices. In some embodiments, the electronic device is a mobile device (e.g., a tablet, a smartphone, a media player, or a wearable device) including wired and/or wireless communication circuitry. The one or more input devices optionally includes a mouse (e.g., external), a trackpad (optionally integrated or external), a touchpad (optionally integrated or external), remote control device (e.g., external), another mobile device (e.g., separate from the electronic device), a handheld device (e.g., external), a controller (e.g., external), and/or a touch screen. a computer including. The display generation component is optionally a display integrated with the electronic device (optionally a touch screen display), external display such as a monitor, projector, television, or a hardware component (optionally integrated or external) for projecting a user interface or causing a user interface to be visible to one or more users. In some embodiments, the display is integrated with the electronic device as a touch screen display that includes a touch sensitive surface. The electronic device is optionally a set-top box in communication with a display and a remote control device or a computer including one or more of a keyboard, mouse, trackpad, and touch screen, and optionally in communication with a display.

In some embodiments, such as in FIG. 6C while displaying, using the display generation component (e.g., 504), a plurality of representations (e.g., 610, 612, and/or 614) of events arranged in a bracket, including a first representation (e.g., 610a) including information about a first event displayed with a first presentation and a second representation (e.g., 610) including information about a second event displayed with the first presentation (702), the electronic device (e.g., 504) receives (704), using the one or more input devices, an input (e.g., contacts 603c and 603d) corresponding to a request to change a view level of the plurality of representations (e.g., 610, 612, and/or 614) of events. In some embodiments, the events are sports events, such as games included in a league or tournament. In some embodiments, the events are a plurality of games between a respective pair of teams in which the winner of a majority of the games advances to the next round. In some embodiments, the bracket is a visual representation of matchups in the league or tournament. For example, the bracket illustrates which teams play in each game of the league or tournament and the relationships between games between rounds in the tournament (e.g., the winners of two games in a respective round compete in the next round). In some embodiments, representations of events in a respective tournament are arranged in the bracket such that representations of events in the same round of the tournament are adjacent to each other along a first axis, such that a row or column of representations of events correspond to events in the respective round. In some embodiments, the representations of the events in the respective round are adjacent to representations in other rounds in the second dimension. In some embodiments, the information about the first event and the information about the second event includes the information described below. In some embodiments, the presentation of the information includes which information is displayed and the format in which the information is displayed. In some embodiments, the first event and the second event are games included in the same round of a tournament or league. In some embodiments, the input corresponding to a request to change the view level is an input directed to the representation of the bracket, such as in FIG. 6C, 6D, or 6F. In some embodiments, the input is a pinch input, such as in FIG. 6C, 6D, or 6F. In some embodiments, the input is directed to a navigation bar including options corresponding to plurality of rounds in a championship, league, or series, such as the input illustrated in FIG. 6H.

In some embodiments, in response to receiving the input (706), in accordance with a determination that the input corresponds to a request to change the view level a first amount, the electronic device (e.g., 500) displays (708), using the display generation component (e.g., 504), the plurality of representations (e.g., 612 and/or 612) of events at a first view level, such as in FIG. 6D, including displaying information about the first event with a second presentation different from the first presentation, wherein the first presentation differs from the second presentation in at least one way other than a difference in size (e.g., a difference in size of the representation and/or the information included therein), and displays information about the second event with the second presentation. In some embodiments, the first and second presentations of information are different in the information that is included and/or the format in which the information is presented. In some embodiments, the electronic device updates the information about the first event and the information about the second event in accordance with a direction of the zoom, such as including more information and/or information in a more detailed format in response to a request to zoom in or including less information and/or information in a less detailed format in response to a request to zoom out. In some embodiments, in response to receiving the input, the electronic device, in addition to and separate from changing the presentation from the first presentation to the second presentation, changes the displayed size of the plurality of representations of events in accordance with a direction and amount of the zoom input, such as increasing the size of the representations in response to a request to zoom in, decreasing the size of the representations in response to a request to zoom out, changing the size of the representations by a first amount in accordance with a request to change the view level a first amount, or changing the size of the representations by a second amount different from the first amount in accordance with a request to change the view level a second amount.

In some embodiments, in response to receiving the input (706), in accordance with a determination that the input corresponds to a request to change the view level a second amount, different from the first amount, the electronic device (e.g., 500) displays (710), using the display generation component, the plurality of representations of events (e.g., 610a and 6120b) at a second view level including displaying information about the first event with a third presentation different from the first presentation, such as in FIG. 6E, wherein the third presentation differs from the second presentation and the first presentation in at least one way other than a difference in size (e.g., a difference in size of the representation and/or the information included therein), and displays information about the second event with the third presentation (e.g., in addition to and separate from changing the displayed size of the plurality of representations of events in accordance with a direction and amount of the zoom input). In some embodiments, the second and third presentations of information are different in the information that is included and/or the format in which the information is presented. Thus, in some embodiments, in response to receiving the request to change the view level while displaying the bracket, the electronic device changes the presentation of information of the representations of events included in the bracket in a manner other than changing the size of the information in accordance with the input. Changing the presentation of information included in the representations of the first and second events in response to detecting the input corresponding to the request to change the view level of the plurality of representations of events enhances user interactions with the electronic device by efficiently toggling between more breath or more depth of information.

In some embodiments, displaying the information (e.g., 610a) about the first event with the first presentation and the information about the second event with the first presentation, such as in FIG. 6C, includes displaying the information (e.g., 610a) about the first event with a first appearance and the information about the second event with the first appearance. In some embodiments, the first appearance includes first text, image(s), and/or formatting to convey the information about the respective event.

In some embodiments, such as in FIG. 6D, displaying the information (e.g., 610a) about the first event with the second presentation and the information about the second event with the second presentation includes displaying the information (e.g., 610a) about the first event with a second appearance different from the first appearance and the information about the second event with the second appearance, and In some embodiments, the second appearance includes second text, image(s), and/or formatting different from the first text, image(s), and/or formatting to convey the information about the respective event.

In some embodiments, such as in FIG. 6E, displaying the information (e.g., 610a) about the first event with the third presentation and the information (e.g., 610b) about the second event with the third presentation includes displaying the information about the first event with a third appearance different from the first appearance and different from the second appearance and the information about the second event with the third appearance. In some embodiments, the third appearance includes third text, image(s), and/or formatting different from the first or second text, image(s), and/or formatting to convey the information about the respective event. In some embodiments, the first, second, and third appearances differ from each other in a characteristic other than size. In some embodiments, in response to receiving the input corresponding to the request to change the view level of the plurality of representations of events, the electronic device changes the appearances of the representations of events in a characteristic other than size and changes the sizes of the representations. Changing the appearance of information corresponding to the events in response to receiving the input corresponding to the request to zoom enhances user interactions with the electronic device by presenting the information in a legible way at multiple view levels.

In some embodiments, such as in FIG. 6C, displaying the information (e.g., 610a) about the first event with the first presentation and the information about the second event with the first presentation includes displaying a first subset of a plurality of characteristics (e.g., information) of the first event and the first subset of the plurality of characteristics (e.g., information) about the second event. The plurality of characteristics (e.g., information) about the respective events is optionally the plurality of characteristics (e.g., information) described in more details below. In some embodiments, the first subset of the characteristics (e.g., information) of the respective events includes a first number of the characteristics (e.g., information) of the respective events.

In some embodiments, such as in FIG. 6D, displaying the information (e.g., 610a) about the first event with the second presentation and the information about the second event with the second presentation includes displaying a second subset of the plurality of characteristics (e.g., information) of the first event different from the first subset and the second subset of the plurality of characteristics (e.g., information) of the second event. In some embodiments, the second subset of the characteristics (e.g., information) of the respective events different from the first subset of the characteristics (e.g., information) includes a second number of the characteristics (e.g., information) of the respective events different from the first number.

In some embodiments, such as in FIG. 6E, displaying the information (e.g., 610a) about the first event with the third presentation and the information (e.g., 610b) about the second event with the third presentation includes displaying a subset of the plurality of characteristics (e.g., information) of the first event different from the first and second subsets and the third subset of the plurality of characteristics (e.g., information) of the second event. In some embodiments, the third subset of the characteristics of the respective events includes a third number of the characteristics of the respective events different from the first and second numbers. In some embodiments, in response to receiving the input corresponding to the request to change the view level of the plurality of representations of events, the electronic device changes the subsets of characteristics of the respective events included in the representations of events and changes the sizes of the representations. In some embodiments, in response to receiving an input corresponding to a request to zoom in, the electronic device increases the amount of information and/or number of characteristics of the events included in the representations of events. In some embodiments, in response to receiving an input corresponding to a request to zoom out, the electronic device decreases the amount of information and/or number of characteristics of the events included in the representations of events. Changing the amount of information corresponding to the events in response to receiving the input corresponding to the request to zoom enhances user interactions with the electronic device by presenting the information in a legible way at multiple view levels and providing an efficient way of changing which information is shown for the respective events.

In some embodiments, such as in FIG. 6E, the plurality of characteristics (e.g., information) of a respective event (e.g., the first event and/or the second event) includes one or more of representations (e.g., 626c, 626d, 626f, and/or 626h) of (e.g., colors and/or images representing) entities associated with the respective event (e.g., teams or participants playing in a sporting event or game), names (e.g., 626f and/or 626h) of the entities associated with the respective event, images (e.g., 626c and/or 626d) (e.g., logos) associated with the entities associated with the respective event, a (e.g., final or current) score (e.g., 626a and/or 626b) associated with the respective event, league rankings (e.g., 262e and/or 626g) of the entities associated with the respective event, or an outcome of the respective event (e.g., an indication of which team or participant(s) won a sporting event). In some embodiments, as described above, in response to receiving the input corresponding to the request to change the view level of the representations of the events, the electronic device changes the subset of the aforementioned characteristics displayed in the representations of the events. In some embodiments, additionally or alternatively, the electronic device changes the sizes of the representations of events in response to the input corresponding to the request to change the view level of the representations of events. Changing the subset of characteristics of the respective events included in the representations of the respective events in response to the input corresponding to the request to change the view level of the representations of the events enhances user interactions with the electronic device by presenting the information in a legible way at multiple view levels and providing an efficient way of changing which information is shown for the respective events.

In some embodiments, such as in FIG. 6C, while displaying the first representation (e.g., 610a) with the first presentation and the second representation with the first presentation, displaying a first number of representations (e.g., 610, 612, and 614) of events arranged in the bracket. In some embodiments, the first number of representations is two representations including the first representation and the second representation. In some embodiments, the first number of representations is a number greater than two, including the first representation, the second representation, and one or more other representations. In some embodiments, the electronic device does not display representations in addition to the first number of representations.

In some embodiments, in response to receiving the input, in accordance with the determination that the input corresponds to the request to change the view level the first amount, the electronic device (e.g., 500) displays a second number different from the first number of representations (e.g., 610 and 612) of events arranged in the bracket, such as in FIG. 6D. In some embodiments, the second number of representations is two representations including the first representation and the second representation. In some embodiments, the second number of representations is a number greater than two, including the first representation, the second representation, and one or more other representations. In some embodiments, in accordance with a determination that the request to change the view level the first amount is a request to zoom in, the second number is less than the first number. In some embodiments, in accordance with a determination that the request to change the view level the first amount is a request to zoom out, the second number is greater than the first number. In some embodiments, the electronic device does not display representations in addition to the second number of representations.

In some embodiments, in response to receiving the input, in accordance with the determination that the input corresponds to the request to change the view level the second amount, the electronic device (e.g., 5000 displays) a third number different from the first and second numbers of representations (e.g., 610a and 610b) of events arranged in the bracket, such as in FIG. 6E. In some embodiments, the third number of representations is two representations including the first representation and the second representation. In some embodiments, the third number of representations is a number greater than two, including the first representation, the second representation, and one or more other representations. In some embodiments, in response to an input corresponding to a request to change the view level a third amount, the electronic device displays one representation of one event without displaying representations of other events. In some embodiments, in accordance with a determination that the request to change the view level the second amount is a request to zoom in, the third number is less than the first number. In some embodiments, in accordance with a determination that the request to change the view level the second amount is a request to zoom out, the third number is greater than the first number. In some embodiments, the electronic device does not display representations in addition to the third number of representations. Changing the number of representations of events displayed in response to receiving the input corresponding to the request to zoom enhances user interactions with the electronic device by maintaining legibility at multiple view levels and providing an efficient way to view different numbers of representations of events.

In some embodiments, such as in FIG. 6D, while displaying the first representation (e.g., 610a) and the second representation (e.g., 610) with the first presentation, the electronic device (e.g., 5000 receives, using the one or more input devices, a second input (e.g., including movement of contacts 603e and 603f) corresponding to a request to change the view level of the plurality of representations (e.g., 610 and 612) of events to a respective view level. In some embodiments, the respective view level is a maximum view level. In some embodiments, the respective view level is a higher view level than the view level when the second input is received. In some embodiments, displaying one or more representations of events at the respective view level includes displaying the one or more representations at a maximum size and/or with a maximum amount of information.

In some embodiments, in response to receiving the second input, the electronic device (e.g., 500) displays, using the display generation component, the first representation (e.g., 610a) at the respective view level including displaying the first representation (e.g., 610a) with a selectable option (e.g., 626m) that, when selected, causes the electronic device to play the first event. In some embodiments, prior to receiving the second input, the electronic device forgoes displaying the selectable option in the first representation. In some embodiments, in response to receiving the second input, the electronic device additionally updates the second representation to include a second selectable option that, when selected, causes the electronic device to play the second event. In some embodiments, in response to receiving the second input, the electronic device additionally ceases display of the second representation (e.g., because at the respective view level, the electronic device displays fewer representations of events than were displayed prior to receiving the second input). In some embodiments, the electronic device receives an input corresponding to selection of the selectable option and, in response, plays the first event. In some embodiments, at one or more levels of zoom other than the respective view level (e.g., levels of zoom that are less detailed or zoomed out compared to the respective view level), the first representation and the second representation do not include the selectable option. In some embodiments, the first representation and the second representation include the selectable option irrespective of the view level. In some embodiments, at different levels of zoom, the electronic device displays the selectable option with different appearances. Displaying the selectable option to play the first event in the first representation enhances user interactions with the electronic device by reducing the time and inputs it takes to view the first event.

In some embodiments, such as in FIG. 6G, while displaying the plurality of representations (e.g., 612 and 614) of events arranged in the bracket, including the first representation including information about the first event and the second representation including information about the second event, the electronic device (e.g., 500) displays, using the display generation component, a navigation bar including a first option (e.g., 608a) corresponding to a first round of a series of events including multiple rounds and a second option (e.g., 608b) corresponding to a second round of the series of events different from the first round, wherein the first event and the second event are included in a third round of the series of events different from the first round and the second round. In some embodiments, while displaying the first representation and the second representation corresponding to displaying representations of events in the third round of the series of events, the electronic device displays a third option corresponding to the third round with a respective value for a visual characteristic that is different from the value of the visual characteristic with which options corresponding to other rounds (e.g., the first round and the second round) are displayed. For example, the visual characteristic is color, size, line thickness, style, highlighting, text style, and/or underlining. In some embodiments, the respective value for the visual characteristic corresponds to increased visual emphasis compared to the visual emphasis of the options corresponding to the other rounds.

In some embodiments, such as in FIG. 6G, while displaying the plurality of representations (e.g., 612 and 614) of events arranged in the bracket, including the first representation including information about the first event and the second representation including information about the second event, the electronic device (e.g., 500) receives, using the one or more input devices, a second input (e.g., including contact 603m) corresponding to selection of the first option or the second option.

In some embodiments, in response to receiving the second input, in accordance with a determination that the input corresponds to selection of the first option (e.g., 608a), the electronic device (e.g., 500) displays, using the display generation component, a third representation (e.g., 610) including information about a third event included in the first round and a fourth representation including information about a fourth event included in the first round, such as in FIG. 6H. In some embodiments, in response to receiving the second input, the electronic device ceases display of the first representation and the second representation. In some embodiments, in response to receiving the selection of the first option, the electronic device additionally updates the first option to be displayed with the respective value for the visual characteristic described above and updates the third option to be displayed with the value of the visual characteristic with which the second option is displayed. In some embodiments, in response to receiving the input, the electronic device maintains display of the first representation and the second representation optionally in a different position in the user interface than the position in the user interface at which the first representation and the second representation were displayed when the second input was received. In some embodiments, in response to receiving the selection of the first option, the electronic device additionally updates the first option to be displayed with the respective value for the visual characteristic described above and continues to display the third option with the respective value for the visual characteristic. In some embodiments, the electronic device displays the third representation and fourth representation with the same view level, presentation, appearance, size, and/or amount of information with which the electronic device displayed or continues to display the first and second representations when the electronic device received the second input. In some embodiments, while displaying the third representation and the fourth representation, the electronic device forgoes display of the fifth representation and the sixth representation described below. In some embodiments, prior to receiving the second input, the electronic device forgoes displaying the third representation and the fourth representation.

In some embodiments, in accordance with a determination that the input corresponds to selection of the second option (e.g., 608c), the electronic device (e.g., 500) displays, using the display generation component, a fifth representation (e.g., 614) including information about a fifth event included in the second round and a sixth representation including information about a sixth event included in the second round, such as in FIG. 6C. In some embodiments, in response to receiving the second input, the electronic device ceases display of the first representation and the second representation. In some embodiments, in response to receiving the selection of the second option, the electronic device additionally updates the second option to be displayed with the respective value for the visual characteristic described above and updates the third option to be displayed with the value of the visual characteristic with which the first option is displayed. In some embodiments, in response to receiving the input, the electronic device maintains display of the first representation and the second representation optionally in a different position in the user interface than the position in the user interface at which the first representation and the second representation were displayed when the second input was received. In some embodiments, in response to receiving the selection of the first option, the electronic device additionally updates the second option to be displayed with the respective value for the visual characteristic described above and continues to display the third option with the respective value for the visual characteristic. In some embodiments, the electronic device displays the fifth representation and sixth representation with the same view level, presentation, appearance, size, and/or amount of information with which the electronic device displayed the first and second representations when the electronic device received the second input. In some embodiments, while displaying the fifth representation and the sixth representation, the electronic device forgoes display of the third representation and the fourth representation described above. In some embodiments, prior to receiving the second input, the electronic device forgoes displaying the fifth representation and the sixth representation. Navigating rounds of the series of events using the first and second options enhances user interactions with the electronic device by efficiently presenting information about each round.

In some embodiments, the navigation bar further includes a fourth option corresponding to a fourth round of the series of events different from the first round and the second round, such as option 608a in FIG. 6J.

In some embodiments, while displaying the plurality of representations of events arranged in the bracket, including representations of events in the first round and representations of events in the second round, such as representations 612 and 614 in FIG. 6J, and the navigation bar, the electronic device (e.g., 500) receives, using the one or more input devices, a third input corresponding to selection of the fourth option, such as contact 603j in FIG. 6J. In some embodiments, the fourth option is displayed with a first visual characteristic different from a second visual characteristic with which the first and second options are displayed because the electronic device currently displays representations for events in the first and second rounds, but does not display events in the fourth round. In some embodiments, the selection input includes a tap on a location of a touch-sensitive display at which the fourth option is displayed. In some embodiments, the selection input includes manipulation of a hardware input device (e.g., a mouse, trackpad, or remote control) while a selection indicator or cursor is displayed at the location of the fourth option.

In some embodiments, in response to receiving the third input, the electronic device (e.g., 500) ceases display of the representations of events in the first round and the representations of events in the second round in the bracket, such as in FIG. 6K. In some embodiments, the electronic device updates the first and second options in the navigation bar to be displayed with the second visual characteristic that indicates that the electronic device is not displaying events in the first and second rounds of the series.

In some embodiments, in response to receiving the third input, the electronic device (e.g., 500) displays, using the display generation component, one or more representations of events in the fourth round in the bracket, such as representations 610*a* and 610*b* in FIG. 6K. In some embodiments, the electronic device displays the one or more representations of events in the fourth round without displaying representations of events from other rounds of the series. In some embodiments, the electronic device updates the fourth option to be displayed with the first visual characteristic that indicates that the electronic device is displaying events in the fourth round of the series. In some embodiments, the electronic device displays the representations of the events in the fourth round at a larger size and/or with more information and/or details per representation compared to the representations of the events in the first and second rounds because the electronic device displays representations of events from fewer rounds of the series. In some embodiments, in response to detecting selection of the fourth option while displaying representations of events from the first round without displaying representations of events from the second round, the electronic device ceases displaying the representations of events from the first round and displays representations of events from the fourth round while maintaining the size and/or amount of information and/or details per representation because the electronic device displays representations from the same number of rounds before and after receiving the input. In some embodiments, in response to receiving an input selecting a fifth option in the navigation bar corresponding to a fifth round in the series while displaying the representations of events from the first and second rounds in the series, the electronic device ceases displaying the representations of the events from the first and second rounds in the series and displays one or more representations of events from the fifth round in the series. In some embodiments, in response to receiving the input selecting the fifth option while displaying the representations of events from the first and second rounds in the series, the electronic device updates the navigation bar from indicating the first and second options as selected to indicating the fifth option as selected. In some embodiments, while displaying the representations of events in the fourth round in the bracket, the electronic device receives one or more of the inputs described above to update (e.g., pan and/or zoom) the bracket and, in response to receiving the input, updates the bracket accordingly. Displaying representations of events from a respective round of the series in response to detecting selection of the option corresponding to the respective round enhances user interactions with the electronic device by reducing the number of inputs needed to view representations of events from the respective round of the series.

In some embodiments, while displaying the plurality of representations of events arranged in the bracket, including one or more representations of events from a first number of first rounds in the series of events, such as representations 610 and 612 in FIG. 6L, and the navigation bar including one or more options corresponding to the one or more first rounds in the series of events, the electronic device (e.g., 500) receives, using the one or more input devices, a third input directed to one of the one or more options corresponding to the one or more first rounds that includes a request to display one or more representations of events from one or more second rounds in the series of events in the bracket, such as movement of contact 603*l* in FIG. 6L. In some embodiments, the first number is one or more and the electronic device displays representations of events from one or more first rounds of the series of events. In some embodiments, the third input includes a drag input, such as detecting touchdown of a contact at a location on a touch screen at which the representation(s) of the one or more first rounds are displayed in the navigation bar followed by movement of the contact (while remaining in contact with the touch screen) towards an option in the navigation bar that corresponds to another round in the series of events. In some embodiments, as described in more detail above, while the electronic device displays the representations of events from the first rounds in the series, the electronic device displays options in the navigation bar corresponding to the first rounds in the series with a visual characteristic (e.g., color, thickness, or other visual style) that indicates that the first rounds are selected and displays options corresponding to other rounds in the series with a different visual characteristic (e.g., color, thickness, or other visual style) that indicates that the other rounds are not selected.

In some embodiments, in response to receiving the third input, the electronic device (e.g., 500) ceases display of one or more of the representations of events from one or more of the first rounds, such as in FIG. 6M. In some embodiments, the electronic device ceases display of representations from a subset of the one or more first rounds and maintains display of representations from another subset of the one or more first rounds. For example, the electronic device transitions from displaying representations of events from a first round and a second round to displaying representations of events from the first round, but not displaying representations of events from the second round. In some embodiments, the electronic device updates the navigation bar to display an option corresponding to a round for which representations are no longer displayed with the visual characteristic that indicates that round is not selected and continues to display an option corresponding to a round for which representations are still displayed with the visual characteristic that indicates that that round is selected. In some embodiments, the electronic device ceases displaying representations of events from any of the one or more first rounds and displays the options corresponding to the one or more first rounds in the navigation bar with the visual characteristic that indicates that those round(s) are not selected. In some embodiments, if the third input includes movement to the left (e.g., movement in a first direction along a first axis), the electronic device ceases displaying representations of events from one or more first rounds corresponding to the right side of the options in the navigation bar that were selected before the input was received (e.g., corresponding to the options in the navigation bar in the second direction along the first axis). In some embodiments, if the third input includes movement to the right (e.g., movement in the second direction along the first axis), the electronic device ceases displaying representations of events from one or more first rounds corresponding to the left side of the options in the navigation bar that were selected before the input was received (e.g., corresponding to the options in the navigation bar in the first direction along the first axis).

In some embodiments, in response to receiving the third input, the electronic device (e.g., 500) displays, using the display generation component, one or more representations of events from the first number of second rounds in the series of events, the second rounds in the series of events different from the first rounds in the series of events, such as representations 614 in FIG. 6M. In some embodiments, the number of rounds associated with the representations of events the electronic device displays in response to receiving the input is the same as the number of rounds associated with the representations of events the electronic device displayed prior to receiving the input. For example, if the electronic device displayed representations of events from two rounds before receiving the input, the electronic device displays representations of events from two rounds in response to receiving the input, with one or more of the rounds displayed in response to the input being different from one or more of the rounds displayed prior to receiving the input. In some embodiments, one or more of the second rounds are the same as one or more of the first round and at least one of the second rounds is different from the one or more first rounds. In some embodiments, if the input includes movement in a first direction, the one or more second rounds includes a round associated with an option in the navigation bar adjacent to the options corresponding to the one or more first rounds in the first direction. For example, if an option associated with a fourth round is displayed adjacent to the options corresponding to the one or more first rounds in the navigation bar in the first direction, in response to the input including movement in the first direction, the electronic device displays representations of events from the one or more second rounds including representations of events from the fourth round. In some embodiments, if the input includes movement in a second direction different from the first direction, the one or more second rounds includes a round associated with an option in the navigation bar adjacent to the options corresponding to the one or more first rounds in the second direction. For example, if an option associated with a fifth round is displayed adjacent to the options corresponding to the one or more first rounds in the navigation bar in the second direction, in response to the input including movement in the second direction, the electronic device displays representations of events from the one or more second rounds including representations of events from the fifth round. In some embodiments, the third input is a swipe input that starts with a contact on the navigation bar that is not at a location of an option corresponding to a round of the series of events of the representations of events displayed in the bracket. In other words, the electronic device navigates between rounds of the series of events in response to swipe input directed to any location of the navigation bar. In some embodiments, the electronic device navigates by a different number of rounds depending on the length/speed/duration of the swipe input. For example, the electronic device will navigate a small number of rounds away in response to a short/small/slow swipe or will navigate a larger number of rounds away in response to long/large/quick swipe. Changing which rounds of the series of events the displayed representations of events are from without changing the number of rounds represented in response to an input directed to the navigation bar enhances user interactions with the computer system by reducing the number of inputs needed to navigate the representations of events in the bracket.

In some embodiments, while displaying the plurality of representations of events arranged in the bracket, including representations of events from one or more first rounds in the series of events and the navigation bar, such as representations 610*a* and 610*b* in FIG. 6K, wherein displaying the navigation bar includes displaying one or more navigation options proximate to one or more first options corresponding to the one or more first rounds in the series of events, the electronic device (e.g., 500) receives, using the one or more input devices, a third input directed to one of the one or more navigation options that includes a request to display one or more representations of events from a fourth round in the series of events in the bracket, such as input 603*k* directed to option 632 in FIG. 6K.

In some embodiments, in response to receiving the third input, the electronic device (e.g., 500) displays, using the display generation component, the one or more representations of events from the fourth round while maintaining display of the representations of events from the one or more first rounds, such as representations 610 and 612 in FIG. 6L. In some embodiments, the electronic device displays the one or more first options in the navigation bar with a first visual characteristic that indicates that the one or more first rounds are selected (e.g., the electronic device is displaying representations of events in the bracket that are from the one or more first rounds). In some embodiments, the electronic device displays one or more other options in the navigation bar that correspond to rounds of the series other than the one or more first rounds of the series with a second visual characteristic that indicates that the one or more other rounds are not selected (e.g., the electronic device does not display representations of events in the bracket that are from the one or more other rounds). In some embodiments, the navigation options are arrows displayed adjacent to the one or more first options in the navigation bar on one or more sides of the one or more first options in the navigation bar. For example, the electronic device displays the navigation option(s) to the left or to the right of the one or more first options in the navigation bar. In some embodiments, the third input includes motion (e.g., a swipe input that includes touchdown of a contact on a touch screen followed by movement of the contact while in contact with the touch screen) away from the one or more first options. For example, the electronic device detects an input directed to a navigation option displayed adjacent to the one or more first options on a first side that includes motion in the first direction away from the one or more first options. In this example, in response to this input, the electronic device additionally selects a fifth option adjacent to the one or more first options in the first direction that corresponds to a fifth round in the series of events. In some embodiments, in response to the input, the electronic device displays the fifth option with the visual characteristic that indicates selection of the fifth option, displays representations of events from the fifth round in the bracket, and updates display of the navigation options to be adjacent to the fifth option on the first side of the fifth option. As another example, the electronic device detects an input directed to a navigation option displayed adjacent to the one or more first options on a second side different from the first side that includes motion in the second direction away from the one or more first options. In this example, in response to this input, the electronic device additionally selects a sixth option adjacent to the one or more first options in the second direction that corresponds to a sixth round in the series of events. In some embodiments, in response to the input, the electronic device displays the sixth option with the visual characteristic that indicates selection of the sixth option, displays representations of events from the sixth round in the bracket, and updates display of the navigation options to be adjacent to the sixth option on the second side of the sixth option. In some embodiments, in response to the third input, the electronic device continues to display one or more options in the navigation bar corresponding to rounds in the series other than the one or more first rounds and the fourth round with the visual characteristic that indicates that these rounds are not selected and continues to forgo display of representations of events from these other rounds of the series of events. In some embodiments, in response to receiving the third input, the electronic device increases the number of rounds of the series of events for which representations of events are displayed in the bracket. In some embodiments, the electronic device increases the number of rounds of the series of events for which the representations of events are displayed by a number corresponding to the speed/distance/duration of the swipe input. For example, in response to a slow/small/short swipe, the electronic device additionally displays representations of events from a small number of rounds, but in response to a quick/large/long swipe, the electronic device additionally displays representations of events from a large number of rounds. Displaying representations of events from an additional round of the series while maintaining representations of events from the one or more first rounds of the series in response to an input directed to the navigation bar enhances user interactions with the computer system by efficiently updating the bracket to include representations of events from an additional round.

In some embodiments, while displaying the plurality of representations (e.g., 610a and 610b) of events arranged in the bracket, including the first representation (e.g., 610a) including information about the first event and the second representation (e.g., 610b) including information about the second event, wherein the first event and the second event are included in a respective round of a series of events including multiple rounds, such as in FIG. 6E, the electronic device (e.g., 500) receives, using the one or more input devices, a second input (e.g., including movement of contact 603i) corresponding to a request to display representations of events included in a round of the series different form the respective round. In some embodiments, the input is a swipe input. In some embodiments, the swipe is in a horizontal direction. In some embodiments, the input is selection of an option corresponding to the round of the series different from the respective round as described in more detail above.

In some embodiments, in response to receiving the second input, in accordance with a determination that the input corresponds to a request to view representations of events in a first round of the series of events different from the respective round, the electronic device (e.g., 500) displays, using the display generation component, a third representation (e.g., 612a) including information about a third event included in the first round and a fourth representation (e.g., 612b) including information about a fourth event included in the first round, such as in FIG. 6F. In some embodiments, in response to receiving the second input, the electronic device ceases display of the first representation and the second representation. In some embodiments, in response to receiving the second input, the electronic device maintains display of the first representation and second representation. In some embodiments, the electronic device displays the third representation and fourth representation with the same view level, presentation, appearance, size, and/or amount of information with which the electronic device displayed the first and second representations when the electronic device received the second input. In some embodiments, while displaying the third representation and the fourth representation, the electronic device forgoes display of the fifth representation and the sixth representation described below. In some embodiments, the input corresponding to the request to view representations of events in the first round is a swipe in a respective direction different from the direction described below with respect to the request to view representations of events in the second round. In some embodiments, if the swipe is in a first direction, the first round is after the respective round in the series of events. In some embodiments, if the swipe is in a second direction different from the first direction, the first round is before the respective round in the series of events. In some embodiments, prior to receiving the second input, the electronic device forgoes displaying the third representation and the fourth representation.

In some embodiments, in accordance with a determination that the input corresponds to a request to view representations of events in a second round of the series of events different from the respective round and the first round, the electronic device (e.g., 500) displays, using the display generation component, a fifth representation including information about a fifth event included in the second round and a sixth representation including information about a sixth event included in the second round. In some embodiments, in response to receiving the second input, the electronic device ceases display of the first representation and the second representation. In some embodiments, in response to receiving the second input, the electronic device maintains display of the first representation and second representation. In some embodiments, the electronic device displays the fifth representation and sixth representation with the same view level, presentation, appearance, size, and/or amount of information with which the electronic device displayed the first and second representations when the electronic device received the second input. In some embodiments, while displaying the fifth representation and the sixth representation, the electronic device forgoes display of the third representation and the fourth representation described above. In some embodiments, the input corresponding to the request to view representations of events in the second round is a swipe in a respective direction different from the direction described above with respect to the request to view representations of events in the first round. In some embodiments, if the swipe is in a first direction, the second round is after the respective round in the series of events. In some embodiments, if the swipe is in a second direction different from the first direction, the second round is before the respective round in the series of events. In some embodiments, prior to receiving the second input, the electronic device forgoes displaying the fifth representation and the sixth representation. Navigating rounds of the series of events enhances user interactions with the electronic device by efficiently presenting information about each round.

In some embodiments, while displaying the plurality of representations of events arranged in the bracket, including the first representation (e.g., 610a) including information about the first event and the second representation (e.g., 610b) including information about the second event, such as in FIG. 6E, the electronic device (e.g., 500) displays, using the display generation component, a navigation bar including a first option (e.g., 608b) corresponding to a first round of a series of events including multiple rounds and a second option (e.g., 608c) corresponding to a second round of the series of events different from the first round, wherein the first event and the second event are included in a third round of the series of events different from the first round and the second round. In some embodiments, the navigation bar has one or more of the characteristics described above. In some embodiments, while displaying representations of events in one or more respective rounds of the series, the electronic device displays options in the navigation bar representing the one or more respective rounds with a first value for a respective visual characteristic. In some embodiments, the electronic device displays options in the navigation bar representing one or more other rounds for which the electronic device is not displaying representations of events in the other rounds with a second value for the visual characteristic different from the first value.

In some embodiments, in response to receiving the second input, in accordance with the determination that the input corresponds to the request to view representations of events in the first round of the series of events different from the respective round, the first option (e.g., 608a) is displayed with a first value for a respective visual characteristic and the second option (e.g., 608b) is displayed with a second value for the respective visual characteristic different from the first value, such as in FIG. 6E. In some embodiments, if the electronic device maintains display of the first representation and the second representation in response to receiving the second input, the electronic device displays the third option corresponding to the third round of the series of events with the first value for the respective visual characteristic. In some embodiments, if the electronic device ceases display of the first representation and the second representation in response to receiving the second input, the electronic device displays the third option corresponding to the third round of the series of events with the second value for the respective visual characteristic. In some embodiments, the visual characteristic is visual emphasis (e.g., color, boldness, highlighting, line style, and/or text style) and the first value for the respective visual characteristic has more visual emphasis than the second value for the respective visual characteristic.

In some embodiments, in accordance with the determination that the input corresponds to the request to view representations of events in the second round of the series of events, the second option (e.g., 608b) is displayed with the first value for the respective visual characteristic and the first option (e.g., 608a) is displayed with the second value for the respective visual characteristic, such as in FIG. 6F. Updating the visual characteristic of the options in the navigation bar in accordance with the rounds of the series that are currently displayed enhances user interactions with the electronic device by providing improved visual feedback to the user.

In some embodiments, in response to receiving the second input, in accordance with a determination that the first representation and second representation were displayed at the first view level while the second input was received, such as in FIG. 6E, in accordance with the determination that the input corresponds to the request to view representations of events in the first round of the series of events different from the respective round, the electronic device (e.g., 500) displays the third representation and the fourth representation at the first view level, such as in FIG. 6F.

In some embodiments, in response to receiving the second input, in accordance with a determination that the first representation and second representation were displayed at the first view level while the second input was received, such as in FIG. 6E, in accordance with the determination that the input corresponds to the request to view representations of events in the second round of the series of events, the electronic device the fifth representation and the sixth representation at the first view level, such as displaying representations of events in a different round with the view level shown in FIG. 6F.

In some embodiments, in response to receiving the second input, in accordance with a determination that the first representation and second representation were displayed at the second view level while the second input was received, such as in FIG. 6G, in accordance with the determination that the input corresponds to the request to view representations of events in the first round of the series of events different from the respective round, the electronic device displays the third representation and the fourth representation at the second view level, such as in FIG. 6H.

In some embodiments, in response to receiving the second input, in accordance with a determination that the first representation and second representation were displayed at the second view level while the second input was received, such as in FIG. 6G, in accordance with the determination that the input corresponds to the request to view representations of events in the second round of the series of events, the electronic device (e.g., 500) displays the fifth representation and the sixth representation at the second view level, such as displaying representations of events in different rounds with the view level shown in FIG. 6H. In some embodiments, the electronic device ceases display of the first representation and the second representation in response to receiving the second input. In some embodiments, the electronic device maintains display of the first representation and the second representation at the first view level in response to receiving the second input. In some embodiments, the electronic device displays the first representation and the second representation at a view level different from the first view level in response to receiving the second input. In some embodiments, in response to receiving the second input, the electronic device displays representations of events in other rounds of the series with the same view level as the view level at which the electronic device displayed the first and second representations when the second input was received. In some embodiments, using the same view level includes displaying the third and fourth representations or the fifth and sixth representations at the same size, with the same amount of information, with the same subset of information, and/or with the same appearance as those with which the electronic device displayed the first and second representations when the electronic device received the second input. In some embodiments, the first view level is associated with a first presentation, size, contents of information, and/or appearance of information and the second view level is associated with a second presentation, size, contents of information and/or appearance different from the first presentation, size, contents of information, and/or appearance of information, as described above. Displaying the third and fourth or fifth and sixth representations with the same view level as the first and second representations enhances user interactions with the electronic device by reducing the number of inputs and battery life needed to browse multiple rounds of the series at the same view level.

In some embodiments, prior to displaying the plurality of events arranged in the bracket, such as in FIG. 6C, the electronic device (e.g., 500) displays, using the display generation component, a user interface that includes one or more representations of content items related to an organization associated with one or more of the events, wherein the user interface further includes a selectable option (e.g., 604d), such as in FIG. 6B. In some embodiments, the organization is an organization associated with the plurality of events, such as a sports league that organizes, sponsors, and/or owns a tournament, series, or championship whose events are arranged in the bracket. In some embodiments, the organization is an organization associated with a subset of the plurality of events, such as a team and/or athlete playing in one or more of the events. In some embodiments, the user interface is a news feed including representations of content related to the league or the team. In some embodiments, the content items include articles, videos, audio content, and/or social media content. In some embodiments, the content items are news content items. In some embodiments, the user interface further includes a portion of the bracket displayed proximate to the selectable option. For example, a user interface including representations of content items related to the league associated with the bracket includes a portion of the bracket including the latest event in the league. As another example, a user interface including representations of content items related to a team associated with the bracket includes a portion of the bracket including the latest event in the league featuring the team. In some embodiments, the selectable option includes text indicating that selection of the option will cause the electronic device to display additional portion(s) of the bracket. For example, the text says "view bracket," "view full bracket," and/or "view more." In some embodiments, a user interface including representations of content items associated with a first team includes a first portion of the bracket and a user interface including representations of content items associated with a second team different from the first team includes a second portion of the bracket different from the first portion of the bracket. In some embodiments, the first portion of the bracket excludes portions of the bracket not related to the first team and the second portion of the bracket excludes portions of the bracket not related to the second team.

In some embodiments, such as in FIG. 6B, while displaying the user interface, the electronic device (e.g., 500) receives, using the one or more input devices, an input (e.g., including contact 603*b*) selecting the selectable option (e.g., 604*d*).

In some embodiments, in response to receiving the input (e.g., including contact 603*b*) selecting the selectable option (e.g., 604*d*), such as in FIG. 6B, the electronic device (e.g., 500) displays the plurality of representations (e.g., 610, 612, and 614) of events arranged in the bracket, such as in FIG. 6C. In some embodiments, the portion of the bracket included in the user interface is static and the electronic device does not pan and/or zoom the portion of the bracket in response to inputs directed to the portion of the bracket. In some embodiments, the bracket displayed in response to detecting selection of the selectable option is interactive as described in more detail above and below with respect to zooming and/or navigating between rounds of the series. Additionally or alternatively, in some embodiments, while displaying the plurality of representations of events arranged in the bracket (e.g., in response to the input selecting the selectable option), in response to detecting an input to scroll the representations of events, the electronic device scrolls the representations of events to display representations of additional events in the same round(s) of the league at the same view level. Displaying the selectable option to view the plurality of events arranged in the bracket in the user interface with representations of other content related to the organization enhances user interactions with the electronic device by reducing the number of inputs and battery life needed to view content related to the bracket.

In some embodiments, such as in FIG. 6C, displaying the first representation (e.g., 614*a*) including information about the first event includes, in accordance with a determination that the first event has not occurred, displaying the first representation (e.g., 614*a*) with a first appearance. In some embodiments, the first appearance includes first colors, formatting, and/or including a first subset of characteristics of the first event in the first representation. For example, a representation of an upcoming game includes one or more indications of participants in the upcoming game, an indication of when the game is scheduled to occur, and/or information about the participants and does not include a score for the game.

In some embodiments, such as in FIG. 6C, displaying the first representation (e.g., 612*a*) including information about the first event includes, in accordance with a determination that the first event is occurring, displaying the first representation (e.g., 612*a*) with a second appearance different from the first appearance. In some embodiments, the second appearance includes second colors, formatting, and/or including a second subset of characteristics of the first event in the first representation different from the first colors, formatting and/or first subset of characteristics. For example, a representation of an ongoing game includes one or more indications of participants in the upcoming game, an indication of when the game is scheduled to occur, a current score, and/or information about the participants and does not include a final score and/or final result for the game.

In some embodiments, such as in FIG. 6C, displaying the first representation (e.g., 612*b*) including information about the first event includes, in accordance with a determination that the first event has occurred, displaying the first representation (e.g., 612*b*) with a third appearance different from the first appearance and second appearance. In some embodiments, the third appearance includes third colors, formatting, and/or including a third subset of characteristics of the first event in the first representation different from the first and second colors, formatting and/or first and second subsets of characteristics. For example, a representation of game that is over includes one or more indications of participants in the upcoming game, an indication of when the game occurred, a final score for the game, the outcome of the game, and/or information about the participants. In some embodiments, the electronic device display representations of other events, such as the second event, using the first, second, or third appearance depending on whether the other events have not occurred, are occurring, or have occurred. In some embodiments, in response to detecting that the first event transitions between upcoming, currently occurring, and having already occurred, the electronic device transitions between displaying the first representation with the first, second, and third appearances, respectively. Displaying the first representation with the appearance based on whether the first event has not occurred, is occurring, or has occurred enhances user interactions with the electronic device by presenting relevant information to the user with fewer inputs and battery life.

In some embodiments, such as in FIG. 6F, while displaying the plurality of representations (e.g., 612*a* and 612*b*) of events at the first view level, the electronic device (e.g., 500) receives, using the one or more input devices, a second input corresponding to a request to change the view level of the plurality (e.g., 612*a* and 612*b*) of representations of events. In some embodiments, the second input is similar to the input described above, such as a pinch (or de-pinch) to zoom touch gesture received using a touch screen.

In some embodiments, in response to receiving the second input, the electronic device (e.g., 500) displays, using the display generation component, the plurality of representations (e.g., 612) of events at a third view level including displaying information about the first event with a fourth presentation different from the second presentation in at least one way other than a difference in size and displaying information about the second event with the fourth presentation. In some embodiments, the third view level is the same as the second view level described above. In some embodiments, the third view level is different from the second view level described above. In some embodiments, while displaying the plurality of representations of events at the second view level, the electronic device receives, using the one or more input devices, a third input corresponding to a request to change the view level of the plurality of representations of events. In some embodiments, in response to receiving the third input, the electronic device displays, using the display generation component, the plurality of representations of events at a fourth view level including displaying information about the second event with a fifth presentation different from the third presentation in at least one way other than a difference in size and displaying information about the first event with the fifth presentation. Changing the presentation of the first and second representations in response to receiving the second input enhances user interactions with the electronic device by efficiently toggling between more breath or more depth of information.

In some embodiments, while displaying the plurality of representations of events at the first view level, such as in FIG. 6D, the electronic device (e.g., 500) receives, using the one or more input devices, a third input corresponding to a request to change the view level of the plurality of representations of events, such as a zoom input in the opposite direction shown in FIG. 6D. In some embodiments, the second input is similar to the input described above, such as a pinch (or de-pinch) to zoom touch gesture received using a touch screen.

In some embodiments, in response to receiving the third input, in accordance with a determination that the third input satisfies one or more criteria, the electronic device (e.g., 500) displays the plurality of representations of events at a respective view level including displaying the information about the first event with the first presentation and the information about the second event with the first presentation, such as in FIG. 6A. In some embodiments, the one or more criteria include criteria that are satisfied when the input corresponds to a request to zoom the plurality of representations to the respective view level at which the electronic device displayed the plurality of representations with the first presentation. In some embodiments, the third input corresponds to the request to zoom the plurality of representations to the respective view level based on the magnitude and direction of the zoom input corresponding to a change in view level between the current view level and the respective view level. In some embodiments, in response to receiving the third input, in accordance with a determination that the third input fails to satisfy the one or more criteria, the electronic device displays the plurality of representations at a view level other than the respective view level that is different from the first view level. Returning the plurality of representations of events to the respective view level in response to receiving the second input enhances user interactions with the electronic device by efficiently toggling between more breadth or more depth of information.

Figure 7:
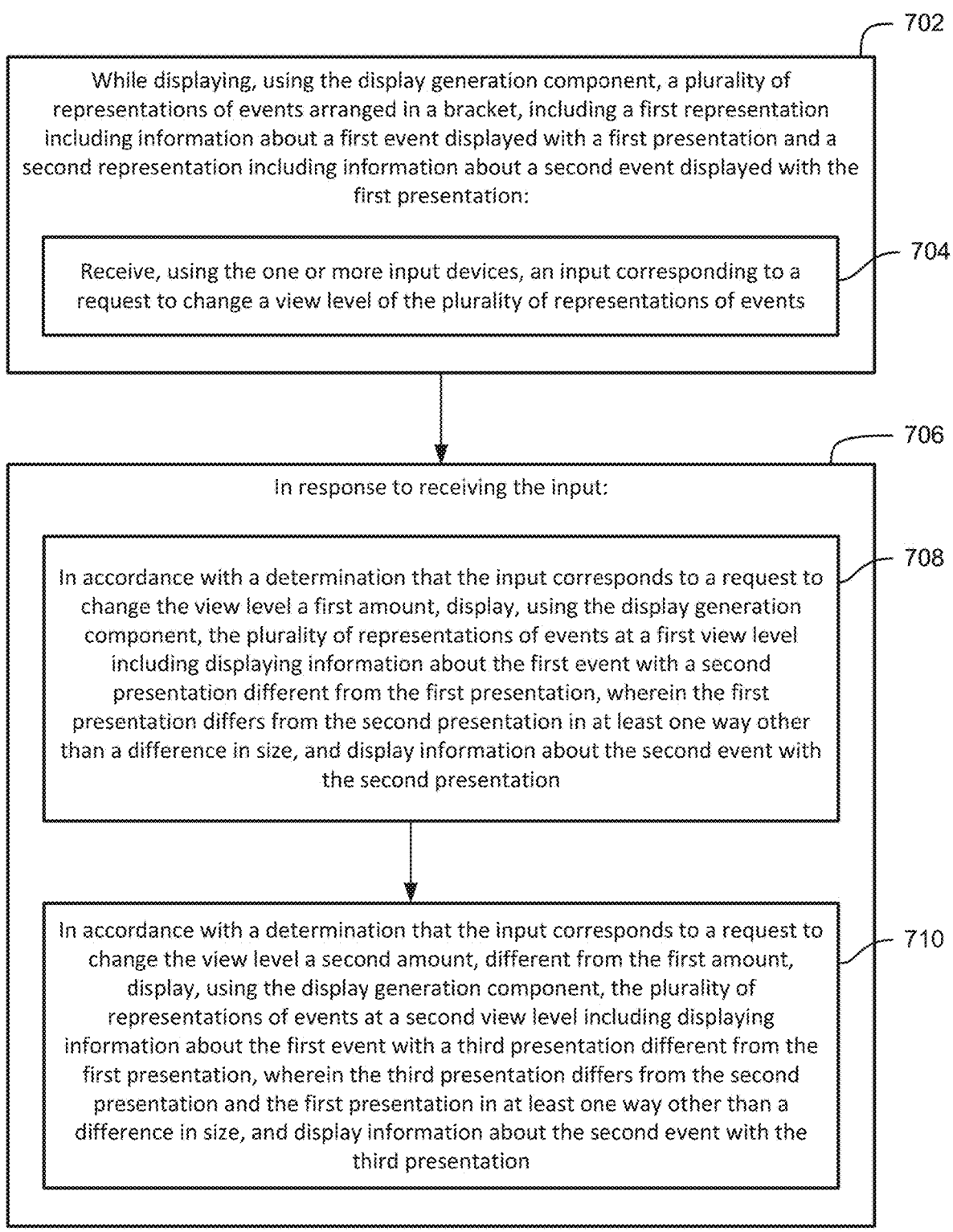
FIG. 7 is a flow diagram illustrating a method in which an electronic device presents representations of events arranged in a bracket in accordance with some embodiments of the disclosure.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIG. 7 are, optionally, implemented by components depicted in FIGS. 1A-1B. For example, receiving operation 704 and displaying operations 708 and 710 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is presenting brackets related to sports teams or leagues. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content consumption activity across various applications can be used to suggest particular brackets to the user. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking in a specific application (e.g., first application and/or second application). In addition to providing "opt in" and "opt out" options, the present disclosure contemplates providing notifications relating to the access or use of personal information. For instance, a user may be notified upon initiating content playback that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content and other user interfaces optionally include brackets in accordance with the embodiments of the disclosure without tracking the content consumption activity of the user.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
at an electronic device in communication with a display generation component and one or more input devices:
while displaying, using the display generation component, a plurality of representations of events arranged in a bracket, including a first representation including information about a first event displayed with a first presentation and a second representation including information about a second event displayed with the first presentation:
receiving, using the one or more input devices, an input corresponding to a request to change a zoom level of the plurality of representations of events; and
in response to receiving the input:
in accordance with a determination that the input corresponds to a request to change the zoom level a first amount, displaying, using the display generation component, the plurality of representations of events at a first zoom level including displaying information about the first event with a second presentation different from the first presentation, wherein the first presentation differs from the second presentation in at least one way other than a difference in size, and displaying information about the second event with the second presentation; and
in accordance with a determination that the input corresponds to a request to change the zoom level a second amount, different from the first amount, displaying, using the display generation component, the plurality of representations of events at a second zoom level including displaying information about the first event with a third presentation different from the first presentation, wherein the third presentation differs from the second presentation and the first presentation in at least one way other than a difference in size, and displaying information about the second event with the third presentation.

2. The method of claim 1, wherein:
displaying the information about the first event with the first presentation and the information about the second event with the first presentation includes displaying the information about the first event with a first appearance and the information about the second event with the first appearance, displaying the information about the first event with the second presentation and the information about the second event with the second presentation includes displaying the information about the first event with a second appearance different from the first appearance and the information about the second event with the second appearance, and
displaying the information about the first event with the third presentation and the information about the second event with the third presentation includes displaying the information about the first event with a third appearance different from the first appearance and different from the second appearance and the information about the second event with the third appearance.

3. The method of claim 1, wherein:
displaying the information about the first event with the first presentation and the information about the second event with the first presentation includes displaying a first subset of a plurality of characteristics of the first event and the first subset of the plurality of characteristics about the second event, displaying the information about the first event with the second presentation and the information about the second event with the second presentation includes displaying a second subset of the plurality of characteristics of the first event different from the first subset and the second subset of the plurality of characteristics of the second event, and
displaying the information about the first event with the third presentation and the information about the second event with the third presentation includes displaying a subset of the plurality of characteristics of the first event different from the first and second subsets and a third subset of the plurality of characteristics of the second event.

4. The method of claim 1, further comprising:
while displaying the first representation with the first presentation and the second representation with the first presentation, displaying a first number of representations of events arranged in the bracket;
in response to receiving the input:
  in accordance with the determination that the input corresponds to the request to change the zoom level the first amount, displaying a second number different from the first number of representations of events arranged in the bracket; and
  in accordance with the determination that the input corresponds to the request to change the zoom level the second amount, displaying a third number different from the first and second numbers of representations of events arranged in the bracket.

5. The method of claim 1, further comprising:
while displaying the first representation and the second representation with the first presentation, receiving, using the one or more input devices, a second input corresponding to a request to change the zoom level of the plurality of representations of events to a respective zoom level; and
in response to receiving the second input:
  displaying, using the display generation component, the first representation at the respective zoom level including displaying the first representation with a selectable option that, when selected, causes the electronic device to play the first event.

6. The method of claim 1, further comprising:
while displaying the plurality of representations of events arranged in the bracket, including the first representation including information about the first event and the second representation including information about the second event:
  displaying, using the display generation component, a navigation bar including a first option corresponding to a first round of a series of events including multiple rounds and a second option corresponding to a second round of the series of events different from the first round, wherein the first event and the second event are included in a third round of the series of events different from the first round and the second round;
  receiving, using the one or more input devices, a second input corresponding to selection of the first option or the second option; and
in response to receiving the second input:
  in accordance with a determination that the input corresponds to selection of the first option, displaying, using the display generation component, a third representation including information about a third event included in the first round and a fourth representation including information about a fourth event included in the first round; and
  in accordance with a determination that the input corresponds to selection of the second option, displaying, using the display generation component, a fifth representation including information about a fifth event included in the second round and a sixth representation including information about a sixth event included in the second round.

7. The method of claim 1, further comprising:
while displaying the plurality of representations of events arranged in the bracket, including the first representation including information about the first event and the second representation including information about the second event, wherein the first event and the second event are included in a respective round of a series of events including multiple rounds:
  receiving, using the one or more input devices, a second input corresponding to a request to display representations of events included in a round of the series different from the respective round; and
in response to receiving the second input:
  in accordance with a determination that the input corresponds to a request to view representations of events in a first round of the series of events different from the respective round, displaying, using the display generation component, a third representation including information about a third event included in the first round and a fourth representation including information about a fourth event included in the first round; and
  in accordance with a determination that the input corresponds to a request to view representations of events in a second round of the series of events different from the respective round and the first round, displaying, using the display generation component, a fifth representation including information about a fifth event included in the second round and a sixth representation including information about a sixth event included in the second round.

8. The method of claim 1, further comprising:
prior to displaying the plurality of representations of events arranged in the bracket, displaying, using the display generation component, a user interface that includes one or more representations of content items related to an organization associated with one or more of the events, wherein the user interface further includes a selectable option;
while displaying the user interface:
  receiving, using the one or more input devices, an input selecting the selectable option; and
  in response to receiving the input selecting the selectable option, displaying the plurality of representations of events arranged in the bracket.

9. The method of claim 1, wherein displaying the first representation including information about the first event includes:
  in accordance with a determination that the first event has not occurred, displaying the first representation with a first appearance, in accordance with a determination that the first event is occurring, displaying the first representation with a second appearance different from the first appearance, and in accordance with a determination that the first event has occurred, displaying the first representation with a third appearance different from the first appearance and second appearance.

10. The method of claim 1, further comprising:

while displaying the plurality of representations of events at the first zoom level, receiving, using the one or more input devices, a second input corresponding to a request to change the zoom level of the plurality of representations of events; and in response to receiving the second input, displaying, using the display generation component, the plurality of representations of events at a third zoom level including displaying information about the first event with a fourth presentation different from the second presentation in at least one way other than a difference in size and displaying information about the second event with the fourth presentation.

11. An electronic device, comprising:

one or more processors;

memory; and one or more programs, wherein the one or more programs are stored in the memory and configured to be executed by the one or more processors, the one or more programs including instructions for:

while displaying, using a display generation component, a plurality of representations of events arranged in a bracket, including a first representation including information about a first event displayed with a first presentation and a second representation including information about a second event displayed with the first presentation:

receiving, using one or more input devices, an input corresponding to a request to change a zoom level of the plurality of representations of events; and in response to receiving the input:

in accordance with a determination that the input corresponds to a request to change the zoom level a first amount, displaying, using the display generation component, the plurality of representations of events at a first zoom level including displaying information about the first event with a second presentation different from the first presentation, wherein the first presentation differs from the second presentation in at least one way other than a difference in size, and displaying information about the second event with the second presentation; and in accordance with a determination that the input corresponds to a request to change the zoom level a second amount, different from the first amount, displaying, using the display generation component, the plurality of representations of events at a second zoom level including displaying information about the first event with a third presentation different from the first presentation, wherein the third presentation differs from the second presentation and the first presentation in at least one way other than a difference in size, and displaying information about the second event with the third presentation.

12. A non-transitory computer readable storage medium storing one or more programs, the one or more programs comprising instructions, which when executed by one or more processors of an electronic device, cause the electronic device to perform a method comprising:

while displaying, using a display generation component, a plurality of representations of events arranged in a bracket, including a first representation including information about a first event displayed with a first presentation and a second representation including information about a second event displayed with the first presentation:

receiving, using one or more input devices, an input corresponding to a request to change a zoom level of the plurality of representations of events; and in response to receiving the input:

in accordance with a determination that the input corresponds to a request to change the zoom level a first amount, displaying, using the display generation component, the plurality of representations of events at a first zoom level including displaying information about the first event with a second presentation different from the first presentation, wherein the first presentation differs from the second presentation in at least one way other than a difference in size, and displaying information about the second event with the second presentation; and in accordance with a determination that the input corresponds to a request to change the view level a second amount, different from the first amount, displaying, using the display generation component, the plurality of representations of events at a second view level including displaying information about the first event with a third presentation different from the first presentation, wherein the third presentation differs from the second presentation and the first presentation in at least one way other than a difference in size, and displaying information about the second event with the third presentation.

13. The electronic device of claim 11, wherein:

displaying the information about the first event with the first presentation and the information about the second event with the first presentation includes displaying the information about the first event with a first appearance and the information about the second event with the first appearance, displaying the information about the first event with the second presentation and the information about the second event with the second presentation includes displaying the information about the first event with a second appearance different from the first appearance and the information about the second event with the second appearance, and displaying the information about the first event with the third presentation and the information about the second event with the third presentation includes displaying the information about the first event with a third appearance different from the first appearance and different from the second appearance and the information about the second event with the third appearance.

14. The electronic device of claim 11, wherein:

displaying the information about the first event with the first presentation and the information about the second event with the first presentation includes displaying a first subset of a plurality of characteristics of the first event and the first subset of the plurality of characteristics about the second event, displaying the information about the first event with the second presentation and the information about the second event with the second presentation includes displaying a second subset of the plurality of characteristics of the first event different from the first subset and the second subset of the plurality of characteristics of the second event, and displaying the information about the first event with the third presentation and the information about the second event with the third presentation includes displaying a subset of the plurality of characteristics of the first event different from the first and second subsets and a third subset of the plurality of characteristics of the second event.

15. The electronic device of claim 11, wherein the one or more programs further include instructions for:
while displaying the first representation with the first presentation and the second representation with the first presentation, displaying a first number of representations of events arranged in the bracket;
in response to receiving the input:
in accordance with the determination that the input corresponds to the request to change the zoom level the first amount, displaying a second number different from the first number of representations of events arranged in the bracket; and
in accordance with the determination that the input corresponds to the request to change the zoom level the second amount, displaying a third number different from the first and second numbers of representations of events arranged in the bracket.

16. The electronic device of claim 11, wherein the one or more programs further include instructions for:
while displaying the first representation and the second representation with the first presentation, receiving, using the one or more input devices, a second input corresponding to a request to change the zoom level of the plurality of representations of events to a respective zoom level; and
in response to receiving the second input:
displaying, using the display generation component, the first representation at the respective zoom level including displaying the first representation with a selectable option that, when selected, causes the electronic device to play the first event.

17. The electronic device of claim 11, wherein the one or more programs further include instructions for:
while displaying the plurality of representations of events arranged in the bracket, including the first representation including information about the first event and the second representation including information about the second event:
displaying, using the display generation component, a navigation bar including a first option corresponding to a first round of a series of events including multiple rounds and a second option corresponding to a second round of the series of events different from the first round, wherein the first event and the second event are included in a third round of the series of events different from the first round and the second round;
receiving, using the one or more input devices, a second input corresponding to selection of the first option or the second option; and
in response to receiving the second input:
in accordance with a determination that the input corresponds to selection of the first option, displaying, using the display generation component, a third representation including information about a third event included in the first round and a fourth representation including information about a fourth event included in the first round; and in accordance with a determination that the input corresponds to selection of the second option, displaying, using the display generation component, a fifth representation including information about a fifth event included in the second round and a sixth representation including information about a sixth event included in the second round.

18. The electronic device of claim 11, wherein the one or more programs further include instructions for:
while displaying the plurality of representations of events arranged in the bracket, including the first representation including information about the first event and the second representation including information about the second event, wherein the first event and the second event are included in a respective round of a series of events including multiple rounds:
receiving, using the one or more input devices, a second input corresponding to a request to display representations of events included in a round of the series different from the respective round; and
in response to receiving the second input:
in accordance with a determination that the input corresponds to a request to view representations of events in a first round of the series of events different from the respective round, displaying, using the display generation component, a third representation including information about a third event included in the first round and a fourth representation including information about a fourth event included in the first round; and
in accordance with a determination that the input corresponds to a request to view representations of events in a second round of the series of events different from the respective round and the first round, displaying, using the display generation component, a fifth representation including information about a fifth event included in the second round and a sixth representation including information about a sixth event included in the second round.

19. The electronic device of claim 11, wherein the one or more programs further include instructions for:
prior to displaying the plurality of representations of events arranged in the bracket, displaying, using the display generation component, a user interface that includes one or more representations of content items related to an organization associated with one or more of the events, wherein the user interface further includes a selectable option;
while displaying the user interface:
receiving, using the one or more input devices, an input selecting the selectable option; and
in response to receiving the input selecting the selectable option, displaying the plurality of representations of events arranged in the bracket.

20. The electronic device of claim 11, wherein displaying the first representation including information about the first event includes:
in accordance with a determination that the first event has not occurred, displaying the first representation with a first appearance,
in accordance with a determination that the first event is occurring, displaying the first representation with a second appearance different from the first appearance, and in accordance with a determination that the first event has occurred, displaying the first representation with a third appearance different from the first appearance and second appearance.

21. The electronic device of claim 11, wherein the one or more programs further include instructions for:
while displaying the plurality of representations of events at the first zoom level, receiving, using the one or more input devices, a second input corresponding to a request to change the zoom level of the plurality of representations of events; and
in response to receiving the second input, displaying, using the display generation component, the plurality of representations of events at a third zoom level including displaying information about the first event with a fourth presentation different from the second presentation in at least one way other than a difference in size and displaying information about the second event with the fourth presentation.

22. The non-transitory computer readable storage medium of claim 12, wherein:
displaying the information about the first event with the first presentation and the information about the second event with the first presentation includes displaying the information about the first event with a first appearance and the information about the second event with the first appearance, displaying the information about the first event with the second presentation and the information about the second event with the second presentation includes displaying the information about the first event with a second appearance different from the first appearance and the information about the second event with the second appearance, and
displaying the information about the first event with the third presentation and the information about the second event with the third presentation includes displaying the information about the first event with a third appearance different from the first appearance and different from the second appearance and the information about the second event with the third appearance.

23. The non-transitory computer readable storage medium of claim 12, wherein: p1 displaying the information about the first event with the first presentation and the information about the second event with the first presentation includes displaying a first subset of a plurality of characteristics of the first event and the first subset of the plurality of characteristics about the second event, displaying the information about the first event with the second presentation and the information about the second event with the second presentation includes displaying a second subset of the plurality of characteristics of the first event different from the first subset and the second subset of the plurality of characteristics of the second event, and
displaying the information about the first event with the third presentation and the information about the second event with the third presentation includes displaying a subset of the plurality of characteristics of the first event different from the first and second subsets and a third subset of the plurality of characteristics of the second event.

24. The non-transitory computer readable storage medium of claim 23, wherein the plurality of characteristics of a respective event includes one or more of representations of entities associated with the respective event, names of the entities associated with the respective event, images associated with the entities associated with the respective event, a score associated with the respective event, league rankings of the entities associated with the respective event, or an outcome of the respective event.

25. The non-transitory computer readable storage medium of claim 12, wherein the method further comprises:
while displaying the first representation with the first presentation and the second representation with the first presentation, displaying a first number of representations of events arranged in the bracket;
in response to receiving the input:
in accordance with the determination that the input corresponds to the request to change the zoom level the first amount, displaying a second number different from the first number of representations of events arranged in the bracket; and in accordance with the determination that the input corresponds to the request to change the zoom level the second amount, displaying a third number different from the first and second numbers of representations of events arranged in the bracket.

26. The nonfitransitory computer readable storage medium of claim 12, wherein the method further comprises:
while displaying the first representation and the second representation with the first presentation, receiving, using the one or more input devices, a second input corresponding to a request to change the zoom level of the plurality of representations of events to a respective zoom level; and
in response to receiving the second input:
displaying, using the display generation component, the first representation at the respective zoom level including displaying the first representation with a selectable option that, when selected, causes the electronic device to play the first event.

27. The non-transitory computer readable storage medium of claim 12, wherein the method further comprises:
while displaying the plurality of representations of events arranged in the bracket, including the first representation including information about the first event and the second representation including information about the second event:
displaying, using the display generation component, a navigation bar including a first option corresponding to a first round of a series of events including multiple rounds and a second option corresponding to a second round of the series of events different from the first round, wherein the first event and the second event are included in a third round of the series of events different from the first round and the second round;
receiving, using the one or more input devices, a second input corresponding to selection of the first option or the second option; and
in response to receiving the second input:
in accordance with a determination that the input corresponds to selection of the first option, displaying, using the display generation component, a third representation including information about a third event included in the first round andia fourth representation including information about a fourth event included in the first round; and
in accordance with a determination that the input corresponds to selection of the second option, displaying, using the display generation component, a fifth representation including information about a fifth event included in the second round and a sixth representation including information about a sixth event included in the second round.

28. The non-transitory computer readable storage medium of claim 27, wherein the navigation bar further includes a fourth option corresponding to a fourth round of the series of events different from the first round and the second round, the method further comprising:
while displaying the plurality of representations of events arranged in the bracket, including representations of events in the first round and representations of events in the second round, and the navigation bar:
receiving, using the one or more input devices, a third input corresponding to selection of the fourth option; and
in response to receiving the third input:
ceasing display of the representations of events in the first round and the representations of events in the second round in the bracket; and
displaying, using the display generation component, one or more representations of events in the fourth round in the bracket.

29. The non-transitory computer readable storage medium of claim 27, the method further comprising:
while displaying the plurality of representations of events arranged in the bracket, including one or more representations of events from a first number of first rounds in the series of events, and the navigation bar including one or more options corresponding to the first rounds in the series of events:
receiving, using the one or more input devices, a third input directed to one of the one or more options corresponding to the first rounds that includes a request to display one or more representations of events from one or more second rounds in the series of events in the bracket; and
in response to receiving the third input:
ceasing display of one or more of the representations of events from one or more of the first rounds; and
displaying, using the display generation component, one or more representations of events from the first number of second rounds in the series of events, the second rounds in the series of events different from the first rounds in the series of events.

30. The non-transitory computer readable storage medium of claim 27, the method further comprising:
while displaying the plurality of representations of events arranged in the bracket, including representations of events from one or more first rounds in the series of events and the navigation bar, wherein displaying the navigation bar includes displaying one or more navigation options proximate to one or more first options corresponding to the one or more first rounds in the series of events:
receiving, using the one or more input devices, a third input directed to one of the one or more navigation options that includes a request to display one or more representations of events from a fourth round in the series of events in the bracket:
in response to receiving the third input: p2 displaying, using the display generation component, the one or more representations of events from the fourth round while maintaining display of the representations of events from the one or more first rounds.

31. The non-transitory computer readable storage medium of claim 12, the method further comprising:
while displaying the plurality of representations of events arranged in the bracket, including the first representation including information about the first event and the second representation including information about the second event, wherein the first event and the second event are included in a respective round of a series of events including multiple rounds:
receiving, using the one or more input devices, a second input corresponding to a request to display representations of events included in a round of the series different from the respective round; and
in response to receiving the second input:
in accordance with a determination that the input corresponds to a request to view representations of events in a first round of the series of events different from the respective round, displaying, using the display generation component, a third representation including information about a third event included in the first round and a fourth representation including information about a fourth event included in the first round; and
in accordance with a determination that the input corresponds to a request to view representations of events in a second round of the series of events different from the respective round and the first round, displaying, using the display generation component, a fifth representation including information about a fifth event included in the second round and a sixth representation including information about a sixth event included in the second round.

32. The non-transitory computer readable storage medium of claim 31, the method further comprising:
while displaying the plurality of representations of events arranged in the bracket, including the first representation including information about the first event and the second representation including information about the second event:
displaying, using the display generation component, a navigation bar including a first option corresponding to the first round of a series of events including multiple rounds and a second option corresponding to the second round of the series of events different from the first round, wherein the first event and the second event are included in a third round of the series of events different from the first round and the second round; wherein
in response to receiving the second input:
in accordance with the determination that the input corresponds to the request to view representations of events in the first round of the series of events different from the respective round, the first option is displayed with a first value for a respective visual characteristic and the second option is displayed with a second value for the respective visual characteristic different from the first value, and
in accordance with the determination that the input corresponds to the request to view representations of events in the second round of the series of events, the second option is displayed with the first value for the respective visual characteristic and the second option is displayed with the second value for the respective visual characteristic.

33. The nonfitransitory computer readable storage medium of claim 31, the method further comprising in response to receiving the second input:
in accordance with a determination that the first representation and second representation were displayed at the first zoom level while the second input was received:
in accordance with the determination that the input corresponds to the request to view representations of events in the first round of the series of events different from the respective round, displaying the third representation and the fourth representation at the first zoom level; and in accordance with the determination that the input corresponds to the request to view representations of events in the second round of the series of events, displaying the fifth representation and the sixth representation at the first zoom level; and in accordance with a determination that the first representation and second representation were displayed at the second zoom level while the second input was received:

in accordance with the determination that the input corresponds to the request to view representations of events in the first round of the series of events different from the respective round, displaying the third representation and the fourth representation at the second zoom level; and in accordance with the determination that the input corresponds to the request to view representations of events in the second round of the series of events, displaying the fifth representation and the sixth representation at the second zoom level.

34. The non-transitory computer readable storage medium of claim 12, the method further comprising prior to displaying the plurality of representations of events arranged in the bracket, displaying, using the display generation component, a user interface that includes one or more representations of content items related to an organization associated with one or more of the events, wherein the user interface further includes a selectable option;

while displaying the user interface:

receiving, using the one or more input devices, an input selecting the selectable option; and in response to receiving the input selecting the selectable option, displaying the plurality of representations of events arranged in the bracket.

35. The non-transitory computer readable storage medium of claim 12, wherein displaying the first representation including information about the first event includes:

in accordance with a determination that the first event has not occurred, displaying the first representation with a first appearance, in accordance with a determination that the first event is occurring, displaying the first representation with a second appearance different from the first appearance, and in accordance with a determination that the first event has occurred, displaying the first representation with a third appearance different from the first appearance and second appearance.

36. The non-transitory computer readable storage medium of claim 12, the method further comprising:

while displaying the plurality of representations of events at the first zoom level, receiving, using the one or more input devices, a second input corresponding to a request to change the zoom level of the plurality of representations of events; and in response to receiving the second input, displaying, using the display generation component, the plurality of representations of events at a third zoom level including displaying information about the first event with a fourth presentation different from the second presentation in at least one way other than a difference in size and displaying information about the second event with the fourth presentation.

37. The non-transitory computer readable storage medium of claim 36, the method further comprising:

while displaying the plurality of representations of events at the first zoom level, receiving, using the one or more input devices, a third input corresponding to a request to change the zoom level of the plurality of representations of events; and in response to receiving the third input, in accordance with a determination that the third input satisfies one or more criteria, displaying the plurality of representations of events at a respective zoom level including displaying the information about the first event with the first presentation and the information about the second event with the first presentation.

* * * * *